(12) United States Patent
Takeuchi

(10) Patent No.: US 10,377,043 B2
(45) Date of Patent: Aug. 13, 2019

(54) ROBOT CONTROL APPARATUS, ROBOT, AND ROBOT SYSTEM

(71) Applicant: Seiko Epson Corporation, Tokyo (JP)

(72) Inventor: Kaoru Takeuchi, Azumino (JP)

(73) Assignee: Seiko Epson Corporation (JP)

( * ) Notice: Subject to any disclaimer, the term of this patent is extended or adjusted under 35 U.S.C. 154(b) by 143 days.

(21) Appl. No.: 15/458,319

(22) Filed: Mar. 14, 2017

(65) Prior Publication Data

US 2017/0266816 A1 Sep. 21, 2017

(30) Foreign Application Priority Data

Mar. 18, 2016 (JP) .................................. 2016-054960

(51) Int. Cl.
*B25J 9/16* (2006.01)
*B25J 13/08* (2006.01)

(52) U.S. Cl.
CPC ........... *B25J 13/085* (2013.01); *B25J 9/1633* (2013.01); *G05B 2219/39343* (2013.01); *G05B 2219/39348* (2013.01); *G05B 2219/39529* (2013.01); *G05B 2219/40586* (2013.01)

(58) Field of Classification Search
CPC ........ B25J 9/0081; B25J 9/045; B25J 9/1633; B25J 13/085; G05B 2219/39343; G05B 2219/39348; G05B 2219/39529; G05B 2219/40586
See application file for complete search history.

(56) References Cited

U.S. PATENT DOCUMENTS

| | | | | |
|---|---|---|---|---|
| 2008/0312769 A1* | 12/2008 | Sato | ...................... | B25J 9/1633 700/249 |
| 2009/0125146 A1* | 5/2009 | Zhang | .................... | B25J 9/1664 700/253 |
| 2015/0290810 A1* | 10/2015 | Iwatake | ................. | B25J 9/1694 700/258 |
| 2016/0075030 A1* | 3/2016 | Takahashi | ............. | B25J 9/1694 700/253 |

FOREIGN PATENT DOCUMENTS

| | | |
|---|---|---|
| JP | 60-205717 A | 10/1985 |
| JP | 06-099371 A | 4/1994 |
| JP | 11-282536 A | 10/1999 |

\* cited by examiner

*Primary Examiner* — Dale Moyer
(74) *Attorney, Agent, or Firm* — Harness, Dickey & Pierce, P.L.C.

(57) ABSTRACT

A robot control apparatus includes a robot control part that controls a robot; and a force detection information acquisition part that acquires force detection information from a force detection unit. The robot control part, in which a range of control values for operating a robot by force control based on the force detection information is designated, operates the robot based on the control values and the designated range.

14 Claims, 13 Drawing Sheets

ROBOT CONTROL APPARATUS, ROBOT, AND ROBOT SYSTEM

BACKGROUND

1. Technical Field

The present invention relates to a robot control apparatus, a robot, and a robot system.

2. Related Art

Research and development of technologies for robots to perform works in predetermined ranges are carried out.

In this regard, a control method for robot of detecting displacement generated between a position of a taught point and a current position of a robot distal end by force control, comparing the detected value with a predetermined threshold value, and performing at least abnormality processing of the robot if the detected value is larger than the threshold value is known (see Patent Document 1 (JP-A-11-282536)).

However, in such a control apparatus, only the displacement between the position of the taught point and the position of the robot distal end is detected, and, if it is possible to restrict movable ranges of the robot distal end in the translation direction by force control at the respective taught points, it is difficult to restrict movements of the robot distal end in rotation directions by force control at the respective taught points and restrict movements of other movable parts of the robot than the robot distal end by force control. The movable parts are e.g. joints of the robot or the like. As a result, the control apparatus may allow the robot to perform an unintended operation.

SUMMARY

An aspect of the invention is directed to a robot control apparatus comprising: a robot control part that controls a robot; and a force detection information acquisition part that acquires force detection information from a force detection unit. The robot control part, in which a range of control values for operating a robot by force control based on the force detection information is designated, operates the robot based on the control values and the designated range.

According to this configuration, the range of control values for operating the robot by the force control is designated, and the robot control apparatus allows the robot to perform the operation based on the control values and the designated range. Thereby, the robot control apparatus can allow the robot to perform the operation according to the designated range.

Another aspect of the invention is directed to the robot control apparatus, in which the range is designated by threshold values with respect to each axis according to a coordinate system.

According to this configuration, the threshold values are designated with respect to each axis according to the coordinate system for the control values for operating the robot, and the robot control apparatus allows the robot to perform an operation based on the control values and the range designated by the designated threshold values. Thereby, the robot control apparatus can allow the robot to perform the operation according to each axis of the coordinate system.

Another aspect of the invention is directed to the robot control apparatus, in which the control values include a position of a control point of the robot, the coordinate system includes a taught point coordinate system indicating a position and an attitude with respect to each taught point with which the control point is allowed to coincide and stored in advance, and first threshold values are designated as the threshold values with respect to each axis according to the taught point coordinate system.

According to this configuration, in the robot control apparatus, the first threshold values are designated as the threshold values with respect to each axis according to the taught point coordinate system. Thereby, the robot control apparatus can allow the robot to perform an operation according to each axis of the taught point coordinate system.

Another aspect of the invention is directed to the robot control apparatus, in which the different first threshold values are designated with respect to each taught point.

According to this configuration, in the robot control apparatus, the different first threshold values are designated with respect to each taught point. Thereby, the robot control apparatus can allow the robot to perform an operation based on the different first threshold values with respect to each taught point.

Another aspect of the invention is directed to the robot control apparatus, in which a shape of a space within a robot coordinate system defined by the first threshold values is a shape according to a trajectory formed by connecting the taught points with lines in an order of the taught points.

According to this configuration, the robot control apparatus allows the robot to perform an operation based on the first threshold values that define the space within the robot coordinate system as the space having the shape according to the trajectory formed by connecting the taught points with lines in the order of the taught points. Thereby, the robot control apparatus can allow the robot to perform different operations inside and outside of the space within the robot coordinate system defined by the control values and the first threshold values.

Another aspect of the invention is directed to the robot control apparatus, in which the control values include a rotation angle of a joint of the robot, the coordinate system includes a joint coordinate system indicating the rotation angle of the joint, and second threshold values are designated as the threshold values with respect to each axis according to the joint coordinate system.

According to this configuration, in the robot control apparatus, the second threshold values are designated as the threshold values according to each axis of the joint coordinate system. Thereby, the robot control apparatus can allow the robot to perform an operation according to each axis of the joint coordinate system.

Another aspect of the invention is directed to the robot control apparatus, in which the coordinate system includes a robot coordinate system, and third threshold values are designated as the threshold values with respect to each axis according to the robot coordinate system.

According to this configuration, in the robot control apparatus, the third threshold values are designated as the threshold values with respect to each axis according to the robot coordinate system. Thereby, the robot control apparatus can allow the robot to perform an operation according to each axis of the robot coordinate system.

Another aspect of the invention is directed to the robot control apparatus, in which the threshold values are designated on predetermined part of the axes according to the coordinate system.

According to this configuration, in the robot control apparatus, the threshold values are designated on the predetermined part of the axes according to the coordinate system. Thereby, the robot control apparatus can allow the robot to perform an operation according to the predetermined part of the axes of the coordinate system.

Another aspect of the invention is directed to the robot control apparatus which allows the robot to perform an operation based on the control values and the range when the control value continues to exceed the range for a predetermined time or more.

According to this configuration, When the control value continues to exceed the threshold value for the predetermined time or more, the robot control apparatus performs the predetermined processing. Thereby, the robot control apparatus can allow the robot to respectively perform different operations before and after the control value continues to exceed the range for the predetermined time or more.

Another aspect of the invention is directed to the robot control apparatus, in which the predetermined processing is different processing from abnormality processing.

According to this configuration, when the control value continues to exceed the threshold value for the predetermined time or more, the robot control apparatus performs different processing from the abnormality processing. Thereby, the robot control apparatus can allow the robot to perform operations by different processing from the abnormality processing before and after the control value continues to exceed the threshold value for the predetermined time or more.

Another aspect of the invention is directed to a robot that is controlled by the robot control apparatus described above.

According to this configuration, the robot designates the range for control values for operating the robot by force control and performs an operation based on the control values and the range. Thereby, the robot can perform the operation according to the designated range.

Another aspect of the invention is directed to a robot system including the robot control apparatus described above and a robot controlled by the robot control apparatus.

According to this configuration, the range is designated for control values for operating the robot by the force control, and the robot system allows the robot to perform the operation based on the control values and the range. Thereby, the robot system can allow the robot to perform the operation according to the designated range.

As described above, the range is designated for control values for operating the robot by the force control, and the robot control apparatus and the robot system allow the robot to perform the operation based on the control values and the range. Thereby, the robot control apparatus may allow the robot to perform the operation according to the designated range.

Further, the robot designates the range for control values for operating the robot by force control and performs the operation based on the control values and the range. Thereby, the robot may perform the operation according to the designated range.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

As below, an embodiment of the invention will be explained with reference to the drawings.

Coordinate Axes of Coordinate Systems in Embodiment

First, coordinate axes of various coordinate systems used in the description of the embodiment are explained. The various coordinate systems used in the description of the embodiment each has six coordinate axes of an X-axis, a Y-axis, a Z-axis, a U-axis, a V-axis, and a W-axis.

An X-axis of a certain coordinate system is a coordinate axis orthogonal to a Y-axis and a Z-axis of the coordinate system and indicating a position in an X-axis direction as a direction along the X-axis (X-axis coordinate). The Y-axis of the coordinate system is a coordinate axis orthogonal to the X-axis and the Z-axis of the coordinate system and indicating a position in a Y-axis direction as a direction along the Y-axis (Y-axis coordinate). The Z-axis of the coordinate system is a coordinate axis orthogonal to the X-axis and the Y-axis of the coordinate system and indicating a position in a Z-axis direction as a direction along the Z-axis (Z-axis coordinate). A U-axis of the coordinate system is a coordinate axis indicating a rotation angle about the X-axis and a position in a U-axis direction as a direction along the U-axis (U-axis coordinate indicating the rotation angle). A V-axis of the coordinate system is a coordinate axis indicating a rotation angle about the Y-axis and a position in a V-axis direction as a direction along the V-axis (V-axis coordinate indicating the rotation angle). A W-axis of the coordinate system is a coordinate axis indicating a rotation angle about the Z-axis and a position in a W-axis direction as a direction along the W-axis (W-axis coordinate indicating the rotation angle).

Note that, in the following explanation, a coincidence of the respective coordinate axes of a first coordinate system as the first coordinate system with the respective coordinate axes of a second coordinate system as the second coordinate system refers to a coincidence of the X-axis in the first coordinate system with the X-axis in the second coordinate system, a coincidence of the Y-axis in the first coordinate system with the Y-axis in the second coordinate system, a coincidence of the Z-axis in the first coordinate system with the Z-axis in the second coordinate system, a coincidence of the U-axis in the first coordinate system with the U-axis in the second coordinate system, a coincidence of the V-axis in the first coordinate system with the V-axis in the second coordinate system, and a coincidence of the W-axis in the first coordinate system with the W-axis in the second coordinate system.

As below, a robot system 1 according to the embodiment will be explained based on the various coordinate systems each having the six coordinate axes.

Configuration of Robot System

Figure 1:
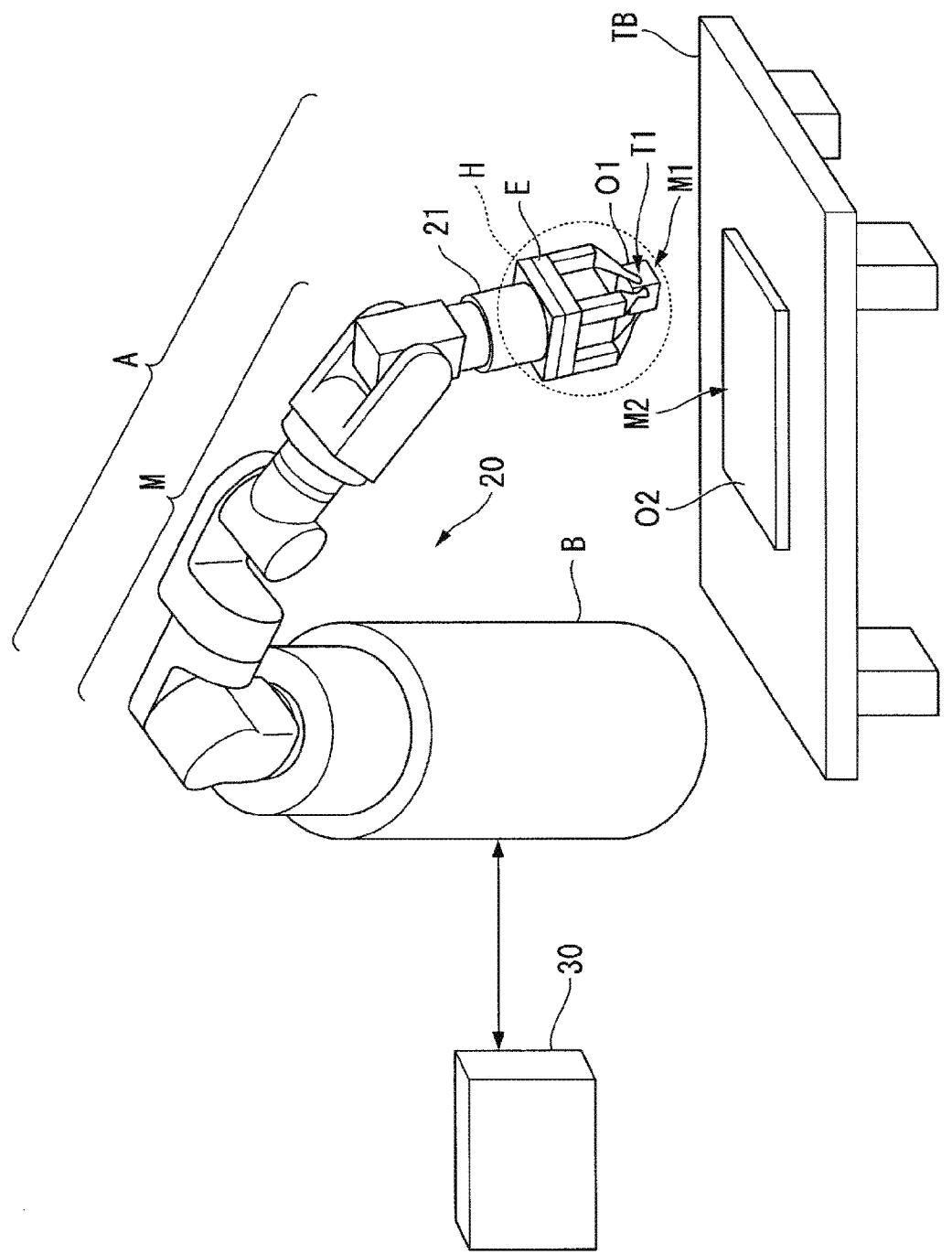
FIG. 1 shows an example of a configuration of a robot system 1 according to an embodiment.

As below, a configuration of the robot system 1 will be explained. FIG. 1 shows an example of the configuration of the robot system 1 according to the embodiment. The robot system 1 includes a robot 20 and a robot control apparatus 30.

The robot 20 is a single-arm robot including an arm A and a support B that supports the arm A. The single-arm robot is a robot including a single arm like the arm A in the example. Note that the robot 20 may be a multi-arm robot in place of the single-arm robot. The multi-arm robot is a robot including two or more arms (e.g. two or more arms A). Of the multi-arm robots, the robot including two arms is also referred to as a dual-arm robot. That is, the robot 20 may be a dual-arm robot including two arms or a multi-arm robot including three or more arms (e.g. three or more arms A). Or, the robot 20 may be another robot such as a scalar robot or Cartesian coordinate robot. The Cartesian coordinate robot is e.g. a gantry robot.

The arm A includes an end effector E, a manipulator M, and a force detection unit 21. The end effector E is an end effector having hook portions that can grasp an object in the example. Note that the end effector E may be another end effector such as an end effector that can lift an object by air suction, magnetic force, a jig, or the like in place of the end effector having the hook portions.

The end effector E is communicably connected to the robot control apparatus 30 by a cable. Thereby, the end effector E performs actions according to control signals acquired from the robot control apparatus 30. Wired communications via the cable are performed according to standards of e.g. Ethernet (registered trademark), USB (Universal Serial Bus), or the like. Or, the end effector E may be adapted to be connected to the robot control apparatus via wireless communications performed according to communication standards of Wi-Fi (registered trademark) or the like.

The manipulator M has seven joints (not shown) referred to as a joint J1, joint J2, joint J3, joint J4, joint J5, joint J6, and joint J7 sequentially from the support B side toward the end effector E side. Further, each of the seven joints has an actuator (not shown). In other words, the arm A having the manipulator M is a seven-axis vertical articulated arm. The arm A performs actions with the degree of freedom of seven axes by cooperative motion of the support B, the end effector E, the manipulator M, and the respective actuators of the seven joints of the manipulator M. Note that the arm A may be adapted to operate with the degree of freedom of six or less axes or with the degree of freedom of eight or more axes.

When the arm A operates with the degree of freedom of seven axes, the number of attitudes that can be taken is larger than that in the case where the arm A operates with the degree of freedom of six or less axes. Thereby, the arm A may smoothly move and easily avoid interferences with objects existing around the arm A, for example. Further, when the arm A operates with the degree of freedom of seven axes, control of the arm A is easier than that in the case where the arm A operates with the degree of freedom of eight or more axes because the calculation amount is less.

The seven actuators (of the joints) of the manipulator M are respectively communicably connected to the robot control apparatus 30 by cables. Thereby, the actuators operate the manipulator M based on the control signals acquired from the robot control apparatus 30. Further, each of the actuators includes an encoder. Each encoder outputs information representing a rotation angle of the actuator having the encoder to the robot control apparatus 30. Wired communications via the cables are performed according to standards of e.g. Ethernet (registered trademark), USB, or the like. Or, part or all of the seven actuators of the manipulator M may be adapted to be connected to the robot control apparatus via wireless communications performed according to communication standards of Wi-Fi (registered trademark) or the like.

In the example, a rotation shaft of a certain joint is aligned with the Z-axis of a joint coordinate system of the joint. The rotation shaft of the joint refers to a rotation shaft of the actuator of the joint. The joint coordinate system is a three-dimensional local coordinate system associated with the actuator of the joint to move with the joint. That is, the rotation angle of the joint is indicated by a position (coordinate) in the W-axis direction in the joint coordinate system associated with the actuator of the joint. The rotation angle of the joint refers to an angle to which the rotation shaft of the actuator of the joint rotates.

In the example, a joint coordinate system J1C is associated with the actuator of the joint J1. A joint coordinate system J2C is associated with the actuator of the joint J2. A joint coordinate system J3C is associated with the actuator of the joint J3. A joint coordinate system J4C is associated with the actuator of the joint J4. A joint coordinate system J5C is associated with the actuator of the joint J5. A joint coordinate system J6C is associated with the actuator of the joint J6. A joint coordinate system J7C is associated with the actuator of the joint J7.

Note that it is not necessarily required that a rotation shaft of a certain joint is aligned with the Z-axis of the joint coordinate system associated with the actuator of the joint. Further, the actuator in the example is an actuator having only one rotation shaft, but may be an actuator having two or more rotation shafts instead. In this case, the joint coordinate systems are associated with the actuators with respect to each rotation shaft for indication of the rotation angles to which the respective two or more rotation shafts rotate.

The force detection unit 21 is provided between the end effector E and the manipulator M. The force detection unit 21 is e.g. a force sensor. The force detection unit 21 detects an external force applied to a hand H. The hand H refers to the end effector E or an object grasped by the end effector E. The external force refers to at least one of a force and moment (torque). Specifically, the magnitude of the force detected by the force detection unit 21 is a magnitude of the force applied to the hand H and magnitudes of forces applied in the respective X-axis direction, Y-axis direction, and Z-axis direction of a force detection coordinate system. Further, the magnitude of the moment detected by the force detection unit 21 is moment applied to the hand H and magnitudes of moment applied in the respective U-axis direction, V-axis direction, and W-axis direction of the force detection coordinate system. The force detection unit 21 outputs force detection information containing force detection values indicating these detected magnitudes to the robot control apparatus 30 via communications. The force detection coordinate system is a three-dimensional local coordinate system associated with the force detection unit 21 to move with the force detection unit 21.

The force detection information is used for force control based on the force detection information of the arm A by the robot control apparatus 30. The force control refers to e.g. compliant motion control such as impedance control. Note that the force detection unit 21 may be another sensor such as a torque sensor that detects an external force applied to the hand H.

The force detection unit 21 is communicably connected to the robot control apparatus 30 by a cable. Wired communications via the cable are performed according to standards of e.g. Ethernet (registered trademark), USB, or the like. Note that the force detection unit 21 and the robot control apparatus 30 may be adapted to be connected via wireless communications performed according to communication standards of Wi-Fi (registered trademark) or the like.

The robot control apparatus 30 is a robot controller in the example. The robot control apparatus 30 generates various control values based on an operation program input by a user in advance. The robot control apparatus 30 generates control signals for operating the actuators of the respective joints of the manipulator M based on the generated control values. The robot control apparatus 30 transmits the generated control signals to the robot 20 to operate the respective actuators, and thereby, operates the robot 20. Here, the control signals include control signals for controlling the end effector E. The robot control apparatus 30 operates the robot 20 in this manner, and allows the robot to perform a predetermined work. The robot control apparatus 30 may be provided in the robot 20 instead of being provided outside of the robot 20.

Predetermined Work by Robot

As below, the predetermined work performed by the robot 20 will be explained.

The robot 20 performs a work of bringing a first surface M1 of a first object O1 grasped by the end effector E into surface contact with a second surface M2 of a second object as the predetermined work.

The first object O1 is an industrial component, member, product, or the like. Note that the first object O1 may be another object such as a commodity component, member, product different from those for industry or a living organism instead. In the example shown in FIG. 1, the first object O1 is shown as an object having a rectangular parallelepiped shape. The shape of the first object O1 may be another shape in place of the rectangular parallelepiped shape.

In the example, the first surface M1 of the first object O1 is a surface farthest from the center of gravity of the end effector E of the surfaces of the first object O1 grasped by the end effector E. Note that the first surface M1 may be another surface except the surface farthest from the center of gravity of the end effector E of the surfaces of the first object O1 grasped by the end effector E instead.

As shown in FIG. 1, the first object O1 is grasped by the end effector E in advance. Note that it is not necessarily required that the first object O1 is grasped by the end effector E in advance. In this case, the predetermined work includes a work by the robot 20 grasping the first object O1 placed in a supply area (not shown) using the end effector E.

The second object O2 is an industrial component, member, product, or the like. Note that the second object O2 may be another object such as a commodity component, member, product different from those for industry or a living organism instead. In the example shown in FIG. 1, the second object O2 is shown as an object having a flat plate shape. The shape of the second object O2 may be another shape in place of the flat plate shape. Further, the second object O2 is mounted on an upper surface of a workbench TB in advance. The workbench TB is a table or the like in the example. Note that the workbench TB may be another object such as a floor surface or rack as long as it has a surface on which the second object O2 can be mounted instead.

The second surface M2 of the second object O2 is e.g. an upper surface of the second object O2. In the example, the upper surface is a surface opposite to a lower surface as a surface in surface contact with the workbench TB of the surfaces of the second object O2. Note that the second surface M2 may be another surface of the second object O2 than the surface instead. As below, as an example, the case where the second surface M2 is a surface orthogonal to the Z-axis in a robot coordinate system RC. Note that the second surface M2 may be a surface not orthogonal to the Z-axis instead.

Outline of Processing by Robot Control Apparatus

As below, the summary of the processing performed by the robot control apparatus 30 will be explained.

The robot control apparatus 30 sets a control point T as a TCP (Tool Center Point) moving with the end effector E in a position associated with the end effector E in advance. The position associated with the end effector E in advance is e.g. a position of the center of gravity of the first object O1 grasped by the end effector E in advance. Note that the position associated with the end effector E may be another position such as the center of gravity of the end effector E or some position associated with the manipulator M instead.

Control point position information as information representing the position of the control point T and control point attitude information as information representing the attitude of the control point T are associated with the control point T. Note that other information may be additionally associated with the control point T. In the robot control apparatus 30, the control point position information and the control point attitude information are designated (determined). The robot control apparatus 30 derives the control values based on the designated control point position information and control point attitude information.

Specifically, the robot control apparatus 30 derives a controlled position, a controlled attitude, and controlled rotation angles as the control values. The controlled position is a position represented by the control point position information. The controlled attitude is a position represented by the control point attitude information. The controlled rotation angles are rotation angles of the actuators of the respective joints of the manipulator M realized when the position and the attitude of the control point T are allowed to coincide with the controlled position and the controlled attitude. The robot control apparatus 30 derives the controlled angles based on the controlled position and the controlled attitude and inverse kinematics.

The robot control apparatus 30 generates the control signals including the derived control values. The robot control apparatus 30 transmits the generated control signals to the robot 20 to operate the actuators of the respective joints of the manipulator M, and the robot control apparatus allows the position of the control point T with the controlled position and allows the attitude of the control point T with the controlled attitude. That is, the control point position information and the control point attitude information are designated, and thereby, the robot control apparatus 30 operates the robot 20. Thereby, the robot control apparatus 30 allows the robot 20 to perform the predetermined work.

In the example, the position of the control point T is indicated by a position of the origin of a control point coordinate system TC in the robot coordinate system RC. Further, the attitude of the control point T is indicated by directions of the respective coordinate axes of the control point coordinate system TC in the robot coordinate system RC. The control point coordinate system TC is a three-dimensional local coordinate system associated with the control point T to move with the control point T. In the example, the above described position and attitude of the first object O1 are indicated by the position and the attitude of the control point T. Further, in the example, the respective coordinate axes of the control point coordinate system TC are the same as the respective coordinate axes of the above described force detection coordinate system. Note that it is not necessarily required that the respective coordinate axes of the control point coordinate system TC are the same as the respective coordinate axes of the above described force detection coordinate system.

The robot control apparatus 30 sets the control point T based on control point setting information input by the user in advance. The control point setting information is e.g. information representing relative position and attitude between the position and the attitude of the center of gravity of the end effector E and the position and the attitude of the control point T. Note that, instead, the control point setting information may be information representing relative position and attitude between some position and attitude associated with the end effector E and the position and the attitude of the control point T, information representing relative position and attitude between some position and attitude associated with the manipulator M and the position and the attitude of the control point T, or information representing relative position and attitude between some position and attitude associated with another part of the robot 20 and the position and the attitude of the control point T.

The robot control apparatus 30 operates the robot 20 by position control. The position control is control by the robot control apparatus 30 operating the robot 20 based on taught point information stored in the robot control apparatus 30 in advance. Specifically, the robot control apparatus 30 moves the control point T by the position control based on taught point information stored in the robot control apparatus 30 in advance.

The taught point information is information representing a taught point. The taught point is an imaginary point as a target to move the control point T when the robot control apparatus 30 operates the manipulator M. Taught point position information, taught point attitude information, and taught point identification information are associated with the taught point. The taught point position information is information representing the position of the taught point. The taught point attitude information is information representing the attitude of the taught point. The taught point identification information is information for identification of the taught point. In the example, the position of the taught point is indicated by a position of the origin of a taught point coordinate system as a three-dimensional coordinate system associated with the taught point in the robot coordinate system RC. Further, the attitude of the taught point is indicated by directions of the respective coordinate axis of the taught point coordinate system in the robot coordinate system RC.

In the position control, in the robot control apparatus 30, one or more taught points represented by the taught point information are sequentially designated based on an operation program input by the user in advance. In the robot control apparatus 30, the taught point position information associated with a designated taught point as a taught point that has been designated is designated as the control point position information and the taught point attitude information associated with the designated taught point is designated as the control point attitude information. That is, in the position control, in the robot control apparatus 30, the control point position information and the control point attitude information are designated based on the designated taught point. Thereby, the robot control apparatus 30 may allow the control point T to coincide with the designated taught point. Note that, in the example, a coincidence of a certain taught point with the control point T refers to a coincidence of the position and the attitude of the taught point with the position and the attitude of the control point T.

Further, in the robot control apparatus 30, when one or more taught points represented by the taught point information are sequentially designated based on the operation program input by the user in advance, a speed at which the control point T is moved with the taught point is designated. Thereby, the robot control apparatus 30 moves the control point T at the speed designated with the designated taught point when allowing the control point T to coincide with the designated taught point. Further, the robot control apparatus 30 calculates an estimated movement time based on the designated speed. The estimated movement time refers to a time estimated to be taken for movement from a first taught point to a second taught point. The first taught point is the first taught point with which the current control point T coincides. The second taught point is the second taught point as the designated taught point. Specifically, the robot control apparatus 30 calculates a distance between the position of the first taught point and the position of the second taught point. The robot control apparatus 30 calculates the estimated movement time based on the calculated distance and the designated speed.

Further, the robot control apparatus 30 operates the robot 20 by force control. The force control is control by the robot control apparatus 30 operating the robot 20 based on the force detection information acquired by the robot control apparatus 30 from the force detection unit 21. Specifically, the robot control apparatus 30 acquires the force detection information from the force detection unit 21. Then, if the force detection values contained in the force detection information acquired from the force detection unit 21 do not satisfy a force control condition, the robot control apparatus 30 changes (corrects) a virtual point as a target to move the control point T from the designated taught point to a corrected taught point. The corrected taught point is a virtual point at which the respective force detection values acquired from the force detection unit 21 when the control point T coincides with the point satisfy a predetermined force control condition. The force control condition is a condition with respect to the force detection values contained in the force detection information acquired from the force detection unit 21. As below, as an example, the case where the force control condition is that the respective force detection values contained in the force detection information acquired from the force detection unit 21 are zero will be explained. Note that the force control condition may be another condition instead.

The robot control apparatus 30 calculates the position and the attitude of the corrected taught point based on the force detection values contained in the force detection information acquired from the force detection unit 21, the current position and attitude of the control point T, and the position and the attitude of the designated taught point in the position control. For the calculation method of the position and the attitude of the corrected taught point, a known method may be used or a method to be developed in the future may be used, and the explanation is omitted. In the robot control apparatus 30, the corrected taught point position information representing the position of the calculated corrected taught point is designated as the control point position information and the corrected taught point attitude information representing the attitude of the calculated corrected taught point is designated as the control point attitude information. Thereby, the robot control apparatus 30 moves the control point T to allow the control point T to coincide with the corrected taught point. Note that, in the example, a coincidence of a certain corrected taught point with the control point T refers to a coincidence of the position and the attitude of the corrected taught point with the position and the attitude of the control point T.

As described above, if the force detection values contained in the force detection information acquired from the force detection unit 21 do not satisfy the force control condition, the robot control apparatus 30 changes the target to move the control point T from the designated taught point to the corrected taught point by the force control, and allows the control point T to coincide with the changed corrected taught point. Thereby, the robot control apparatus 30 may move the control point T according to the external force applied to the hand H. As a result, the robot control apparatus 30 may suppress deformation of another object due to an interference of the hand H with the object.

Here, when the robot control apparatus 30 allows the control point T to coincide with the corrected taught point by the force control, if the magnitude of the external force applied to the hand H is larger than an intended magnitude, the control point T may change into unintended position and attitude. The unintended position and attitude are e.g., when the robot 20 is allowed to perform the predetermined work, a position and an attitude in which the robot 20 is difficult to continue the predetermined work.

To suppress this, in the robot control apparatus 30 in the example, a range is designated for the control values for operating the robot 20 by the force control, and the robot 20 is allowed to perform an operation based on the control values and the range. More specifically, in the robot control apparatus 30, threshold values are designated with respect to each axis according to the coordinate system for the control values for operating the robot 20, and the robot 20 is allowed to perform an operation based on the control values and the range designated by the designated threshold values. The axes refer to coordinate axes in this example. Thereby, the robot control apparatus 30 may allow the robot to perform an operation according to the designated range, i.e., the designated threshold values. As below, the processing with threshold values designated with respect to each axis according to the coordinate system by the robot control apparatus 30 allowing the robot 20 to perform an operation based on the control values and the threshold values will be explained in detail. Note that the axes according to a certain coordinate system may be part of the X-axis, Y-axis, Z-axis, U-axis, V-axis, and W-axis or all of the X-axis, Y-axis, Z-axis, U-axis, V-axis, and W-axis.

Hardware Configuration of Robot Control Apparatus

Figure 2:
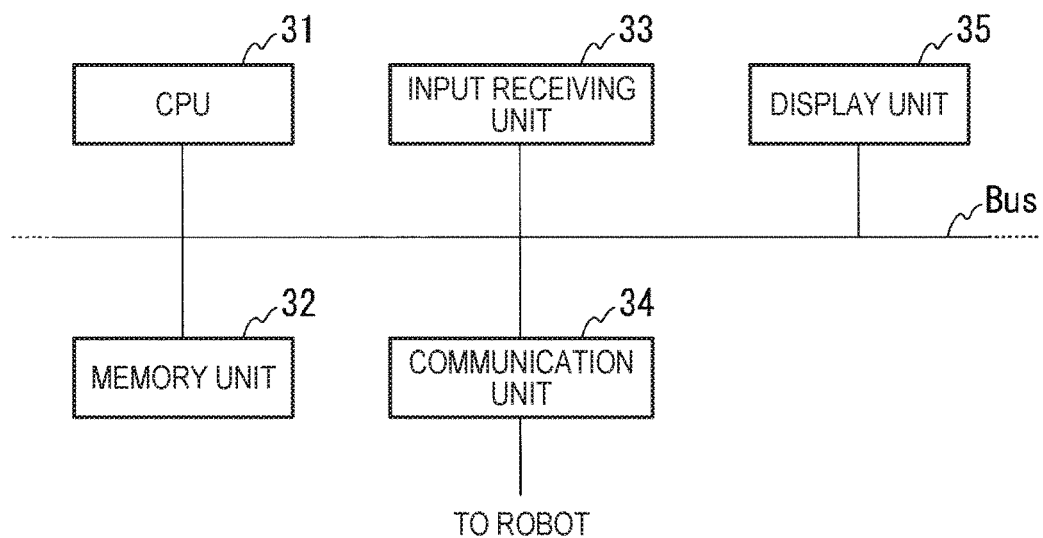
FIG. 2 shows an example of a hardware configuration of a robot control apparatus 30.

As below, referring to FIG. 2, a hardware configuration of the robot control apparatus 30 will be explained. FIG. 2 shows an example of the hardware configuration of the robot control apparatus 30.

The robot control apparatus 30 includes e.g. a CPU (Central Processing Unit) 31, a memory unit 32, an input receiving unit 33, a communication unit 34, and a display unit 35. Further, the robot control apparatus 30 communicates with the robot 20 via the communication unit 34. These component elements are communicably connected to one another via a bus Bus.

The CPU 31 executes various programs stored in the memory unit 32.

The memory unit 32 includes e.g. an HDD (Hard Disk Drive), an SSD (Solid State Drive), an EEPROM (Electrically Erasable Programmable Read-Only Memory), a ROM (Read-Only Memory), a RAM (Random Access Memory), or the like. Note that the memory unit 32 may be an external memory device connected via a digital input-output port including USB or the like in place of the unit built in the robot control apparatus 30. The memory unit 32 stores various kinds of information, images to be processed by the robot control apparatus 30, various programs including operation programs, and taught point information.

The input receiving unit 33 is e.g. a touch panel integrally formed with the display unit 35. Note that the input receiving unit 33 may be an input device including a keyboard, mouse, touch pad, etc.

The communication unit 34 includes e.g. a digital input-output port such as a USB or an Ethernet (registered trademark) port.

The display unit 35 is e.g. a liquid crystal display panel or an organic EL (ElectroLuminescence) display panel.

Functional Configuration of Robot Control Apparatus

Figure 3:
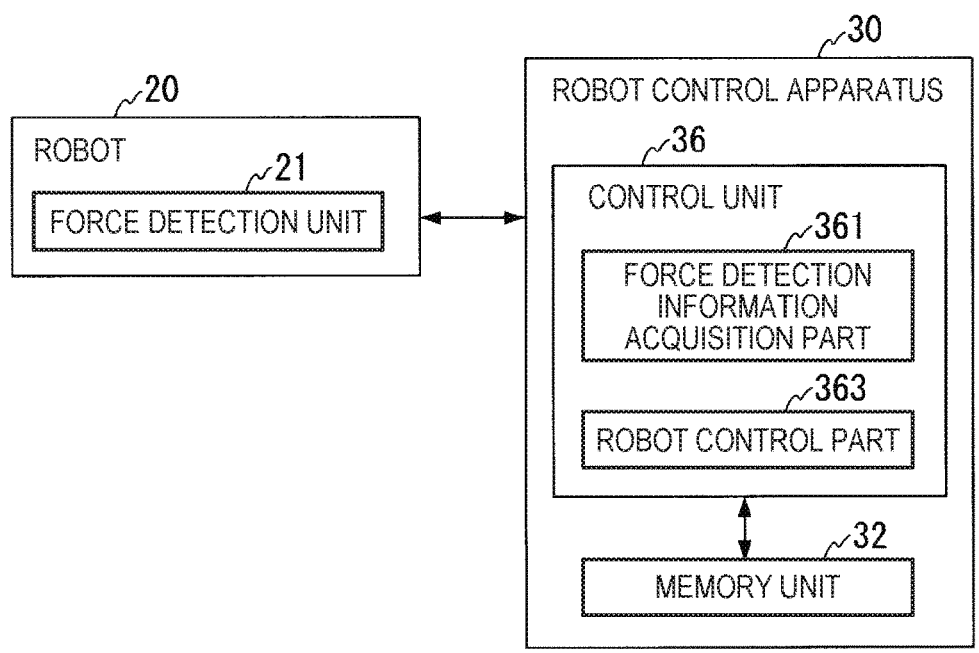
FIG. 3 shows an example of a functional configuration of the robot control apparatus 30.

As below, referring to FIG. 3, a functional configuration of the robot control apparatus 30 will be explained. FIG. 3 shows an example of the functional configuration of the robot control apparatus 30.

The robot control apparatus 30 includes the memory unit 32 and a control unit 36.

The control unit 36 controls the entire robot control apparatus 30. The control unit 36 includes a force detection information acquisition part 361 and a robot control part 363. These functional parts of the control unit 36 are realized by the CPU 31 executing various programs stored in the memory unit 32, for example. Part or all of the functional parts may be a hardware functional part such as an LSI (Large Scale Integration) or an ASIC (Application Specific Integrated Circuit).

The force detection information acquisition part 361 acquires the force detection information from the force detection unit 21.

The robot control part 363 reads the operation program and the taught point information from the memory unit 32. The robot control part 363 operates the robot 20 by the position control based on the read operation program and taught point information. Further, the robot control part 363 operates the robot 20 by the force control based on the force detection information acquired by the force detection information acquisition part 361. Thereby, the robot control part 363 allows the robot 20 to perform the predetermined work.

Specific Example of Processing by Robot Control Apparatus

As below, a specific example of processing performed by the robot control apparatus 30 will be explained.

In the robot control apparatus 30 in the example, when one or more taught points represented by the taught point information are sequentially designated based on the above described operation program, a coordinate system desired by the user and threshold values with respect to each axis according to the coordinate system are designated. Here, in the robot control apparatus 30, the coordinate system desired by the user and threshold values of predetermined part of the axes of the respective axes according to the coordinate system may be designated. Further, in the robot control apparatus 30, when the coordinate system is designated, as the coordinate system desired by the user, part or all of the taught point coordinate system associated with the designated taught point, the robot coordinate system RC, the joint coordinate system J1C associated with the joint J1, the joint coordinate system J2C associated with the joint J2, the joint coordinate system J3C associated with the joint J3, the joint coordinate system J4C associated with the joint J4, the joint coordinate system J5C associated with the joint J5, the joint coordinate system J6C associated with the joint J6, and the joint coordinate system J7C associated with the joint J7 are designated based on the operation program.

The threshold values with respect to each axis according to the coordinate system desired by the user refer to the upper limit values and the lower limit values with respect to each axis. The upper limit values with respect to each axis are upper limit values of the positions (coordinates) in the axis directions with respect to each axis. Further, the lower limit values with respect to each axis are lower limit values of the positions (coordinates) in the axis directions with respect to each axis. For example, in the case where the coordinate system is the robot coordinate system RC and the axes according to the coordinate system are the X-axis and the Y-axis in the robot coordinate system RC, the threshold values with respect to each axis according to the coordinate system are the upper limit value and the lower limit value of the X-axis and the upper limit value and the lower limit value of the Y-axis. Note that the threshold values with respect to each axis according to the coordinate system may be either of the upper limit values and the lower limit values with respect to each axis in place of the upper limit values and the lower limit values with respect to each axis.

After the coordinate system desired by the user and the threshold values with respect to each axis according to the coordinate system are designated, the robot control apparatus 30 calculates a variable range of the control values according to the designated coordinate system based on the designated threshold values with respect to each axis. In the case where the coordinate system is the taught point coordinate system, the control values refer to at least one of the controlled position and the controlled attitude. Or, in the case where the coordinate system is the robot coordinate system RC, the control values refer to the controlled position. Or, in the case where the coordinate system is the joint coordinate system, the control values refer to part or all of the seven controlled rotation angles. In the example, the variable range of the control values is a range designated (indicated) by the threshold values with respect to each axis according to the coordinate system of the ranges in which the robot control apparatus 30 can change the control values.

After the calculation of the above described variable range, the robot control apparatus 30 operates the robot 20 based on the calculated variable range and the control values derived based on the designated control point position information and control point attitude information. As below, a specific example of the calculated variable ranges as the variable ranges of the control values according to the respective coordinate systems and the processing of the robot control apparatus 30 based on the variable ranges will be explained.

Specific Examples of Variable Ranges of Control Values According to Taught Point Coordinate System As below, referring to FIGS. 4 to 7, specific examples of the variable ranges according to the taught point coordinate system will be explained. As below, for convenience of explanation, the threshold values designated with respect to each axis of the taught point coordinate system in the robot control apparatus 30 will be referred to as first threshold values for explanation.

Figure 4:
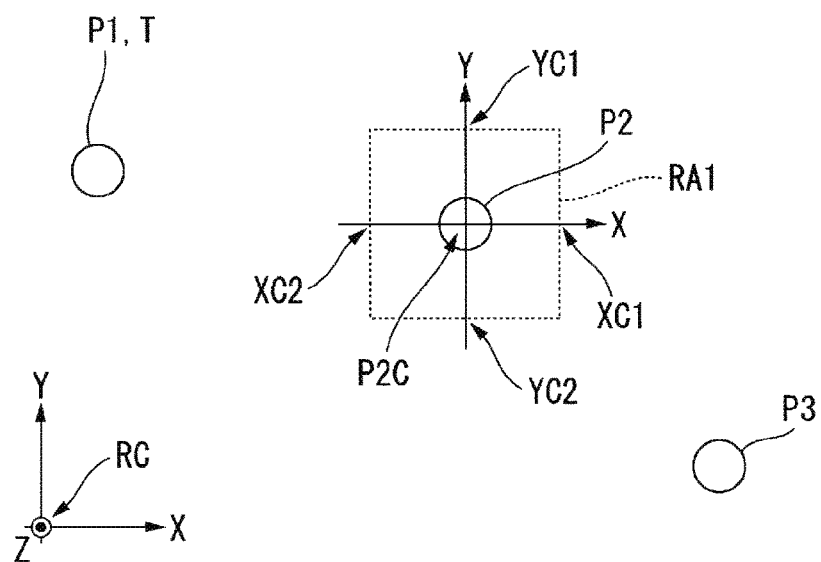
FIG. 4 shows an example of a provisional variable range calculated based on first threshold values designated with respect to each of an X-axis and a Y-axis of a taught point coordinate system.
Figure 5:
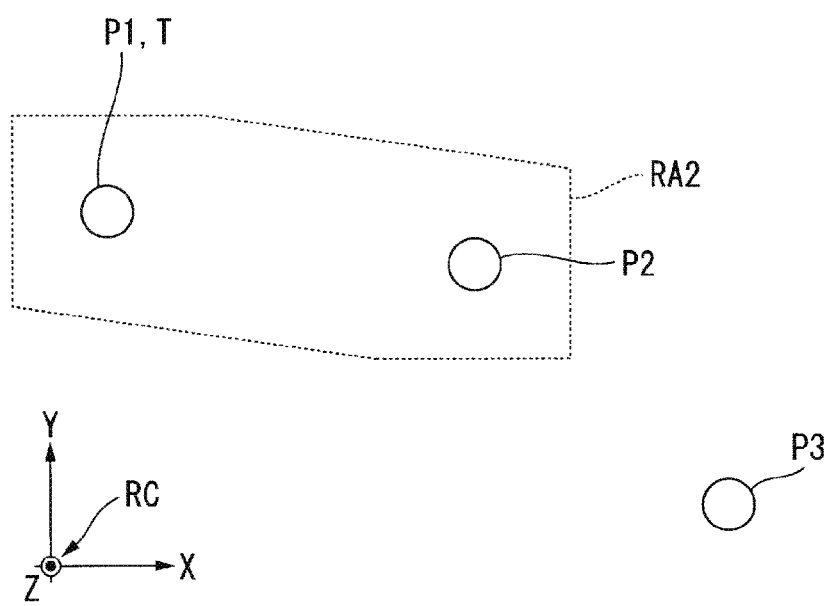
FIG. 5 shows an example of a first variable range calculated by the robot control apparatus 30 based on a variable range RA1 shown in FIG. 4.
Figure 6:
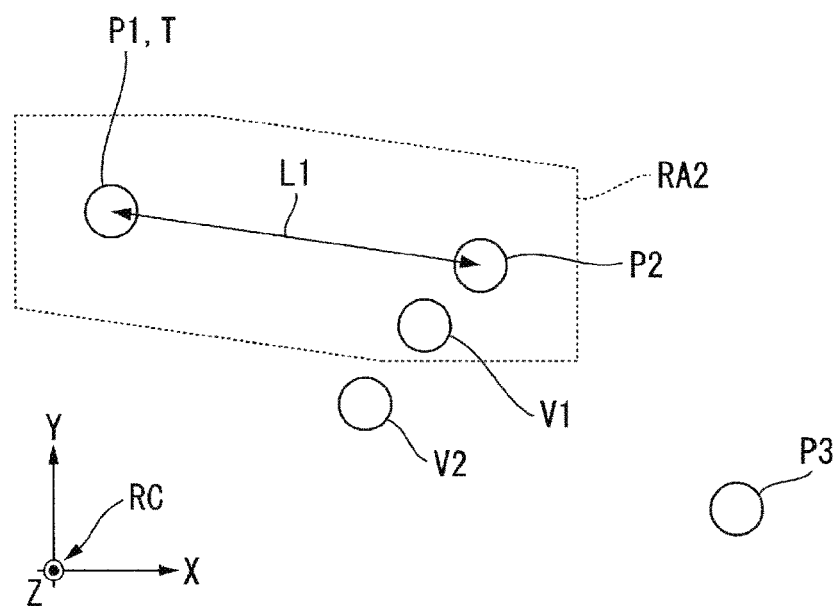
FIG. 6 respectively exemplifies a corrected taught point within a variable range RA2 and a corrected taught point not within the variable range RA2.

First, referring to FIGS. 4 to 6, a specific example of a first variable range as a variable range calculated based on the first threshold values designated with respect to each of the X-axis, Y-axis, and Z-axis of the taught point coordinate system and processing by the robot control apparatus 30 based on the first variable range is explained. Note that, in FIGS. 4 to 6, for simplification of explanation, the case where the control point T does not move in the Z-axis direction in the robot coordinate system RC is explained. That is, all of the taught points shown in FIGS. 4 to 6 fall within a single plane orthogonal to the Z-axis of the robot coordinate system RC. Accordingly, in FIGS. 4 to 6, the case where the first threshold values are not designated on the Z-axis of the taught point coordinate system in the robot control apparatus 30 is explained. Note that, in the robot control apparatus 30, in the case where the threshold values are not designated for part of the respective axes of the designated coordinate system, the threshold values may not be designated by designation of infinity as the threshold value for the part.

FIG. 4 shows an example of a provisional variable range calculated based on the first threshold values designated with respect to each of the X-axis and the Y-axis of the taught point coordinate system. The provisional variable range refers to a variable range of the control values calculated for calculation of the first variable range. In FIG. 4, a taught point P1 is a taught point designated by the previous position control or a corrected taught point obtained by correction of the taught point by the previous force control in the robot control apparatus 30. In the example shown in FIG. 4, the control point T coincides with the taught point P1. A taught point P2 is a designated taught point designated by the robot control apparatus 30 in the present position control. Unless an external force is applied to the hand H, the robot control apparatus 30 moves the control point T and allows the control point T to coincide with the taught point P2. As shown in FIG. 4, a taught point coordinate system P2C is associated with the taught point P2. The taught point coordinate system P2C indicates the position and the attitude of the taught point P2 in the robot coordinate system RC. Further, a taught point P3 is a taught point designated by the next position control in the robot control apparatus 30.

A value XC1 of the X-axis of the taught point coordinate system P2C shown in FIG. 4 indicates the upper limit value of the X-axis of the first threshold values designated in the robot control apparatus 30. Further, a value XC2 of the X-axis indicates the lower limit value of the X-axis of the first threshold values. A value YC1 of the Y-axis of the taught point coordinate system P2C shown in FIG. 4 indicates the upper limit value of the Y-axis of the first threshold values. Further, a value YC2 of the Y-axis indicates the lower limit value of the Y-axis of the first threshold values. A variable range RA1 indicates a provisional variable range calculated by the robot control apparatus 30 based on the first threshold values designated in the robot control apparatus 30. The shape of the variable range RA1 is a square shape in the example shown in FIG. 4. Note that, instead, the shape of the variable range RA1 may be another shape such as a circular shape that passes through the respective first threshold values designated in the robot control apparatus 30 based on the first threshold values designated in the robot control apparatus 30.

In the robot control apparatus 30, when the taught point P2 is designated as the next designated taught point, the taught point coordinate system P2C is designated as the coordinate system desired by the user and the first threshold values with respect to each of the X-axis and the Y-axis of the taught point coordinate system. P2C are further designated with the taught point P2 based on the operation program input by the user in advance. The first threshold values are respectively the value XC1, the value XC2, the value YC1, the value YC2 shown in FIG. 4. The robot control apparatus 30 calculates the variable range RA1 of the control values according to the taught point coordinate system P2C based on the designated first threshold values. In the example shown in FIG. 4, the control values refer to the controlled position of the controlled position and the controlled attitude.

The robot control apparatus 30 calculates the first variable range based on the calculated variable range RA1. Specifically, the robot control apparatus 30 calculates the first variable range based on the variable range RA1. More specifically, the first variable range is a space based on the variable range RA1 of the spaces in the robot coordinate system RC.

FIG. 5 shows an example of the first variable range calculated by the robot control apparatus 30 based on the variable range RA1 shown in FIG. 4. A variable range RA2 shown in FIG. 5 is the first variable range calculated based on the variable range RA1. The robot control apparatus 30 calculates the variable range RA2 as a region that the variable range RA1 passes when moving the taught point P2 to the taught point P1 with the variable range RA1 along the movement trajectory of the control point T moved by the robot control apparatus 30. The movement trajectory is a trajectory in which the control point T moves from the taught point P1 to the taught point P2 in the robot coordinate system RC. That is, the shape of the variable range RA2 is a shape according to the movement trajectory. The movement trajectory may be a line or curve. The robot control apparatus 30 calculates the region that the variable range RA1 passes when moving the taught point P2 to the taught point P1 with the variable range RA1 along the movement trajectory as the variable range RA2. Note that, in the example, the movement trajectory is designated as a line or curve based on the operation program input by the user in advance in the robot control apparatus 30.

After the calculation of the variable range RA2, when an external force is applied to the hand H during the movement of the control point T from the taught point P1 to the taught point P2, the robot control apparatus 30 calculates the position and the attitude of the corrected taught point as described above. The robot control apparatus 30 determines whether or not the position of the calculated position and attitude (i.e., the controlled position) falls within the variable range RA2. Then, the robot control apparatus 30 performs processing according to a determination result as to whether or not the position falls within the variable range RA2. For example, if determining that the position falls within the variable range RA2, the robot control apparatus 30 changes the designated taught point to the corrected taught point, and then, moves the control point T and allows the control point T to coincide with the corrected taught point. Then, in the robot control apparatus 30, the taught point P3 as the taught point designated next based on the above described operation program is designated as the designated taught point. On the other hand, the robot control apparatus 30 performs predetermined processing if determining that the position does not fall within the variable range RA2. The predetermined processing is e.g. abnormality processing. The abnormality processing is to stop the operation of the robot 20 in the example. Note that the abnormality processing may be other processing instead. Or, the robot control apparatus 30 may stop only the processing of operating the robot 20 by the position control, but perform processing of operating the robot 20 only by the force control in the abnormality processing.

FIG. 6 respectively exemplifies a corrected taught point within the variable range RA2 and a corrected taught point not within the variable range RA2. A taught point V1 shown in FIG. 6 is a corrected taught point in a position within the variable range RA2. Further, a taught point V2 shown in FIG. 6 is a corrected taught point in a position not within the variable range RA2.

If the position of the corrected taught point calculated by the robot control apparatus 30 is the position of the taught point V1, the robot control apparatus 30 changes the designated taught point to the taught point V1, and then, moves the control point T to allow the control point T to coincide with the taught point V1. Then, in the robot control apparatus 30, the taught point P3 as the taught point designated next based on the above described operation program is designated as the designated taught point. On the other hand, the robot control apparatus 30 performs e.g. abnormality processing as the predetermined processing if the position of the corrected taught point calculated by the robot control apparatus 30 is the position of the taught point V2.

Note that, when the robot control apparatus 30 moves the control point T to the corrected taught point, the abnormality processing may have a configuration of not moving the control point T to the outside of the variable range RA2 such as a configuration of recalculating a position of an intersection between a boundary surface between the outside of the variable range RA2 and the variable range RA2 and a line connecting from the current position of the control point T to the position of the corrected taught point as the position of the corrected taught point. In the case of recalculation of the position of the corrected taught point, the robot control apparatus 30 allows the control point T to coincide with the corrected taught point in the recalculated position. Thereby, the robot control apparatus 30 may restrict the actions of the robot with respect to each of the X-axis and the Y-axis of the taught point coordinate system. Note that, in the case where the first threshold values are designated with respect to each of the X-axis, Y-axis, Z-axis of the taught point coordinate system in the robot control apparatus 30, the robot control apparatus 30 may restrict the actions of the robot with respect to each of the X-axis, Y-axis, Z-axis of the taught point coordinate system. In this case, the shape of the variable range RA1 is e.g. a spherical shape.

Figure 7:
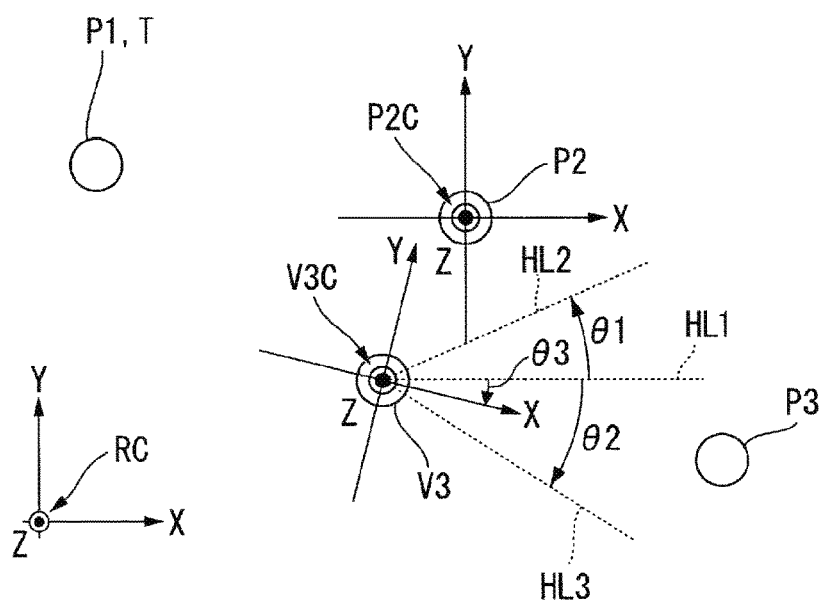
FIG. 7 shows an example of a second variable range calculated based on the first threshold values designated on a W-axis of the taught point coordinate system.

Next, referring to FIG. 7, a specific example of a second variable range as a variable range calculated based on the first threshold values designated with respect to each of the U-axis, V-axis, and W-axis of the taught point coordinate system and processing by the robot control apparatus 30 based on the second variable range is explained. Note that, in FIG. 7, for simplification of explanation, the case where the control point T does not rotate in the respective directions of the U-axis and the V-axis in the robot coordinate system RC is explained. Accordingly, in FIG. 7, the case where the first threshold values are not designated on the U-axis and the V-axis of the taught point coordinate system in the robot control apparatus 30 is explained.

FIG. 7 shows an example of the second variable range calculated based on the first threshold values designated on the W-axis of the taught point coordinate system. Note that the relative position and attitude relationship between the taught point P1 to taught point P3 and the control point T shown in FIG. 7 is the same as the relative position and attitude relationship between the taught point P1 to taught point P3 and the control point T shown in FIG. 4, and the explanation is omitted. Further, in FIG. 7, as an example, the case where the robot control apparatus 30 changes the target to move the control point T from the taught point P2 to a taught point V3 based on an external force applied to the hand H is explained. That is, the taught point V3 is a corrected taught point. Further, a taught point coordinate system V3C shown in FIG. 7 is a taught point coordinate system associated with the taught point V3. An auxiliary line HL1 extending from the origin of the taught point coordinate system V3C is an auxiliary line drawn for clearly showing the attitude of the taught point coordinate system V3C in parallel to the X-axis of the taught point coordinate system P2C.

Here, in the example, a direction in which a line extending from the origin of a certain taught point coordinate system in parallel to the XY-plane of the taught point coordinate system indicates the position of the W-axis in the taught point coordinate system. As below, as an example, the case where a direction from the negative direction toward the positive direction of the X-axis of the taught point coordinate system indicates the origin of the W-axis will be explained. Note that the origin may be indicated by another direction instead. Further, in the case where the taught point coordinate system is seen from the positive direction toward the negative direction of the Z-axis in the taught point coordinate system, a direction rotating counterclockwise about the origin of the taught point coordinate system is the positive direction of the W-axis of taught point coordinate system.

In the robot control apparatus 30, when the taught point P2 is designated as the next designated taught point, the taught point coordinate system P2C is designated as the coordinate system desired by the user and the first threshold values of the W-axis of the taught point coordinate system. P20 are further designated with the taught point P2 based on the operation program input by the user in advance. The first threshold values are respectively an upper limit value $\theta 1$ and a lower limit value $\theta 2$. The robot control apparatus 30 calculates a range between the upper limit value $\theta 1$ and the lower limit value $\theta 2$ as the second variable range of the control values according to the taught point coordinate system P2C based on the designated first threshold values. In the example shown in FIG. 7, the control values refer to the controlled attitude of the controlled position and the controlled attitude.

After the calculation of the second variable range, when an external force is applied to the hand H during the movement of the control point T from the taught point P1 to the taught point P2, the robot control apparatus 30 calculates the position and the attitude of the taught point V3 as the corrected taught point as described above. The robot control apparatus 30 calculates a difference between the attitude of the calculated position and attitude (i.e., the controlled attitude) and the attitude of the taught point P2. The robot control apparatus 30 determines whether or not the calculated difference falls within the second variable range.

In the example shown in FIG. 7, the difference is an angle $\theta 3$ between the auxiliary line HL1 and the X-axis of the taught point coordinate system V3C. In FIG. 7, an auxiliary line HL2 and an auxiliary line HL3 are drawn for clearly showing whether or not the difference falls within the second variable range. The auxiliary line HL2 is an auxiliary line extending from the origin of the taught point coordinate system V3C and aligned with the auxiliary line HL1 when the auxiliary line HL1 is rotated about the origin by the upper limit value $\theta 1$ counterclockwise. The auxiliary line HL3 is an auxiliary line extending from the origin of the taught point coordinate system V3C and aligned with the auxiliary line HL1 when the auxiliary line HL1 is rotated about the origin by the lower limit value $\theta 2$ clockwise. That is, in the example shown in FIG. 7, the difference falls within the second variable range.

The robot control apparatus 30 performs processing according to a determination result as to whether or not the difference falls within the second variable range. For example, if determining that the difference falls within the second variable range, the robot control apparatus 30 changes the designated taught point to the taught point V3 as the corrected taught point, and then, moves the control point T to allow the control point T to coincide with the taught point V3. Then, in the robot control apparatus 30, the taught point P3 as the taught point designated next based on the above described operation program is designated as the designated taught point. On the other hand, if determining that the difference does not fall within the second variable range, the robot control apparatus 30 performs e.g. abnormality processing as the predetermined processing.

Note that the abnormality processing may have a configuration of, when the robot control apparatus 30 moves the control point T to the corrected taught point, ensuring that the difference falls within the second variable range indicated by the first threshold values such as a configuration of, if the difference exceeds the upper limit value of the W-axis designated as the first threshold value, recalculating the attitude of the corrected taught point so that the difference may be the upper limit value and, if the difference exceeds the lower limit value of the W-axis designated as the first threshold value, recalculating the attitude of the corrected taught point so that the difference may be the lower limit value. In the case of recalculation of the attitude of the corrected taught point, the robot control apparatus 30 allows the control point T to coincide with the corrected taught point in the recalculated attitude.

As explained in FIGS. 4 to 7, the first threshold values are designated with respect to each axis according to the taught point coordinate system, and the robot control apparatus 30 operates the robot 20 based on the designated first threshold values. Thereby, the robot control apparatus 30 may allow the robot 20 to perform the actions according to each axis of the taught point coordinate system. Note that, in FIGS. 4 to 7, the example in which the first threshold values with respect to each of the X-axis and Y-axis and the first threshold values with respect to the W-axis are separately designated by the robot control apparatus 30 is explained, however, the first threshold values may be designated by the robot control apparatus 30 with respect to part or all of the X-axis, Y-axis, Z-axis, U-axis, V-axis, W-axis.

In the robot control apparatus 30, when the first threshold values are designated with respect to each axis according to the taught point coordinate system, the first threshold values may be designated on a rotation axis for rotation of the control point T from the current attitude of the control point T to the attitude of the corrected taught point in the taught point coordinate system. In this case, the robot control apparatus 30 calculates the rotation axis for rotation of the current attitude of the control point T to the calculated attitude of the corrected taught point. Then, the robot control apparatus 30 determines whether or not the difference between the attitude of the corrected taught point and the current attitude of the control point T falls within the second variable range based on the designated first threshold values.

Specific Example of Variable Range of Control Values According to Robot Coordinate System As below, a specific example of a third variable range as a variable range of the control values according to the robot coordinate system will be explained with reference to FIGS. 8 and 9. As below, for convenience of explanation, the threshold values designated with respect to each axis of the robot coordinate system in the robot control apparatus 30 will be referred to as third threshold values for explanation.

Figure 8:
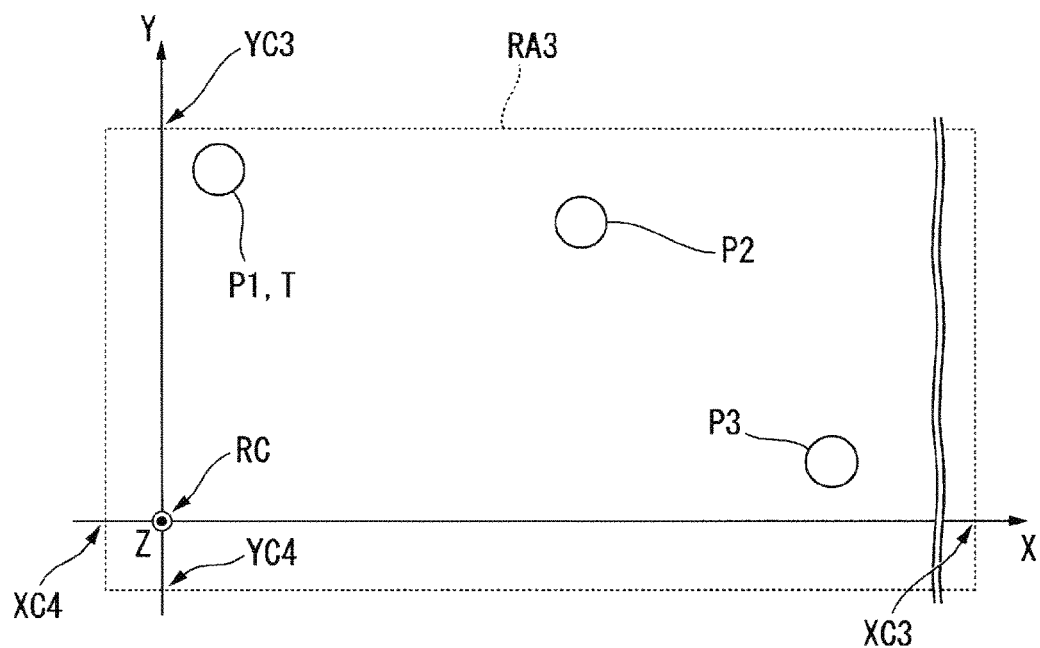
FIG. 8 shows an example of a third variable range calculated based on third threshold values designated with respect to each of an X-axis and a Y-axis of a robot coordinate system RC.

First, referring to FIG. 8, a specific example of the third variable range calculated based on the third threshold values designated with respect to each of the X-axis, Y-axis, and Z-axis of the robot coordinate system RC and processing by the robot control apparatus 30 based on the third variable range is explained. Note that, in FIG. 8, for simplification of explanation, the case where the control point T does not move in the Z-axis direction in the robot coordinate system RC is explained. That is, all of the taught points shown in FIG. 8 fall within a single plane orthogonal to the Z-axis in the robot coordinate system RC. Accordingly, in FIG. 8, the case where the third threshold values are not designated on the Z-axis of the robot coordinate system RC in the robot control apparatus 30.

FIG. 8 shows an example of the third variable range calculated based on the third threshold value designated with respect to each of the X-axis and the Y-axis of the robot coordinate system RC. Note that the relative position and attitude relationship between the taught point P1 to taught point P3 and the control point T shown in FIG. 8 is the same as the relative position and attitude relationship between the taught point P1 to taught point P3 and the control point T shown in FIG. 4, and the explanation is omitted.

A value XC3 of the X-axis of the robot coordinate system RC shown in FIG. 8 indicates the upper limit value of the X-axis of the third threshold values designated in the robot control apparatus 30. Further, a value XC4 of the X-axis indicates the lower limit value of the X-axis of the third threshold values. A value YC3 of the Y-axis of the robot coordinate system RC shown in FIG. 8 indicates the upper limit value of the Y-axis of the third threshold values. Further, a value YC4 of the Y-axis indicates the lower limit value of the Y-axis of the third threshold values. A variable range RA3 indicates the third variable range calculated by the robot control apparatus 30 based on the designated third threshold values in the robot control apparatus 30. The shape of the variable range RA3 is a rectangular shape in the example shown in FIG. 8. Note that, instead, the shape of the variable range RA3 may be another shape such as a circular shape that passes through the respective third threshold values designated in the robot control apparatus 30 based on the third threshold values designated in the robot control apparatus 30.

In the robot control apparatus 30, when the taught point P2 is designated as the next designated taught point, the robot coordinate system RC is designated as the coordinate system desired by the user and the third threshold values with respect to each of the X-axis and the Y-axis of the robot coordinate system RC are further designated with the taught point P2 based on the operation program input by the user in advance. The third threshold values are respectively the value XC3, the value XC4, the value YC3, the value YC4 shown in FIG. 8. The robot control apparatus 30 calculates the variable range RA3 of the control values according to the robot coordinate system RC based on the designated third threshold values. In the example shown in FIG. 8, the control values refer to the controlled position of the controlled position and the controlled attitude.

After the calculation of the variable range RA3, when an external force is applied to the hand H during the movement of the control point T from the taught point P1 to the taught point P2, the robot control apparatus 30 calculates the position and the attitude of the corrected taught point as described above. The robot control apparatus 30 determines whether or not the position of the calculated position and attitude (i.e., the controlled position) falls within the variable range RA3. Then, the robot control apparatus 30 performs processing according to a determination result as to whether or not the position falls within the variable range RA3. For example, if determining that the position falls within the variable range RA3, the robot control apparatus 30 changes the designated taught point to the corrected taught point, and then, moves the control point T and allows the control point T to coincide with the corrected taught point. Then, in the robot control apparatus 30, the taught point P3 as the taught point designated next based on the above described operation program is designated as the designated taught point. On the other hand, the robot control apparatus 30 performs e.g. abnormality processing as the predetermined processing if determining that the position does not fall within the variable range RA3.

Note that, when the robot control apparatus 30 moves the control point T to the corrected taught point, the abnormality processing may have a configuration of not moving the control point T to the outside of the variable range RA3 such as a configuration of recalculating a position of an intersection between a boundary surface between the outside of the variable range RA3 and the variable range RA3 and a line connecting from the current position of the control point T to the position of the corrected taught point as the position of the corrected taught point. In the case of recalculation of the position of the corrected taught point, the robot control apparatus 30 allows the control point T to coincide with the corrected taught point in the recalculated position. In this manner, the robot control apparatus 30 may restrict the actions of the robot with respect to each of the X-axis and the Y-axis of the robot coordinate system RC. Note that, in the case where the third threshold values are designated with respect to each of the X-axis, Y-axis, Z-axis of the robot coordinate system RC in the robot control apparatus 30, the robot control apparatus 30 may restrict the actions of the robot with respect to each of the X-axis, Y-axis, Z-axis of the robot coordinate system RC. In this case, the shape of the variable range RA3 is e.g. a spherical shape.

In the robot control apparatus 30, in the example shown in FIG. 8, the third threshold values are designated with respect to each of the X-axis and Y-axis in the robot coordinate system RC, however, not limited to that. The third threshold values may be designated with respect to part or all of the X-axis, Y-axis, Z-axis, U-axis, V-axis, W-axis in the robot coordinate system RC. Particularly, in the case where the third threshold values are designated with respect to part or all of the U-axis, V-axis, W-axis in the robot coordinate system RC, the robot control apparatus 30 may restrict the operation of the robot 20 within at least a partial region (range) of a solid angle around the origin of the robot coordinate system RC represented by the third threshold values.

Figure 9:
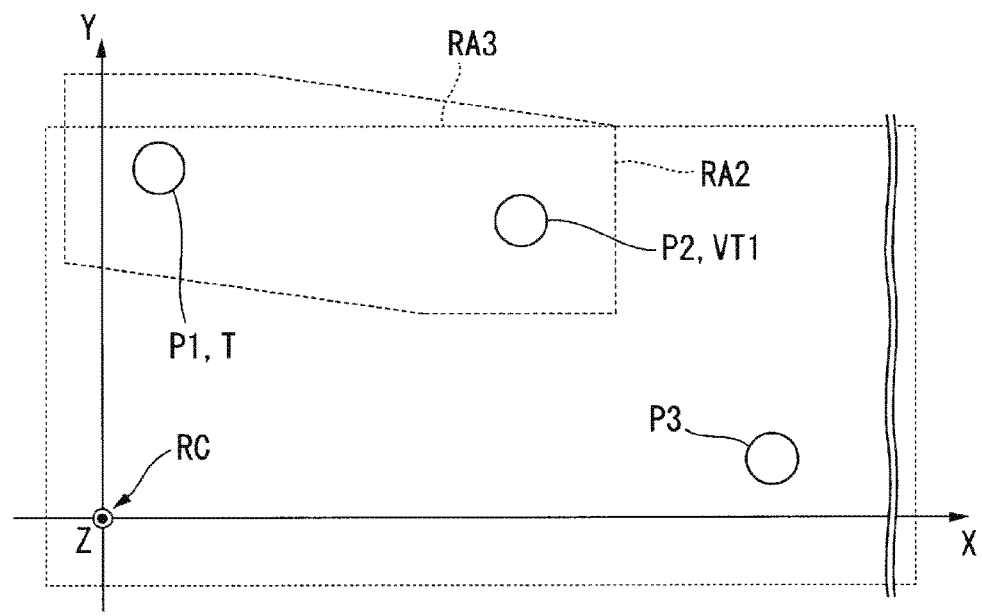
FIG. 9 shows the example of the variable range RA2 described in FIGS. 5 and 6 and the example of a variable range RA3 described in FIG. 8 superimposed in the robot coordinate system RC.

FIG. 9 shows the example of the variable range RA2 described in FIGS. 5 and 6 and the example of the variable range RA3 described in FIG. 8 superimposed in the robot coordinate system RC. In the case where the first threshold values are designated with respect to each of the X-axis and the Y-axis in the taught point coordinate system P2C and the third threshold values are designated with respect to each of the X-axis and the Y-axis in the robot coordinate system RC, the robot control apparatus 30 performs processing in response to a superimposition region in which the variable range RA2 and the variable range RA3 are superimposed.

Specifically, when an external force is applied to the hand H during the movement of the control point T from the taught point P1 to the taught point P2, the robot control apparatus 30 calculates the position and the attitude of the corrected taught point as described above. The robot control apparatus 30 determines whether or not the position of the calculated position and attitude (i.e., the controlled position) falls within the superimposition region. Then, the robot control apparatus 30 performs processing according to a determination result as to whether or not the position falls within the superimposition region. For example, if determining that the position falls within the superimposition region, the robot control apparatus 30 changes the designated taught point to the corrected taught point, and then, moves the control point T and allows the control point T to coincide with the corrected taught point. Then, in the robot control apparatus 30, the taught point P3 as the next taught point is designated as the designated taught point based on the above described operation program. On the other hand, the robot control apparatus 30 performs e.g. abnormality processing as the predetermined processing if determining that the position does not fall within the superimposition region.

In this manner, the third threshold values are designated with respect to each axis of the robot coordinate system RC, and the robot control apparatus 30 operates the robot 20 based on the designated third threshold values. Thereby, the robot control apparatus 30 may allow the robot 20 to perform the actions according to each axis of the robot coordinate system RC.

Specific Example of Variable Range of Control Values According to Joint Coordinate System As below, referring to FIGS. 10 to 12, a specific example of a fourth variable range as a variable range of control values according to the joint coordinate system will be explained. As below, for convenience of explanation, the threshold values designated with respect to each axis according to the joint coordinate system in the robot control apparatus will be referred to as second threshold values for explanation. As below, as an example, the case where the second threshold values are designated on the W-axis of the joint coordinate system J4C associated with the joint J4 in the robot control apparatus 30 will be explained.

Figure 10:
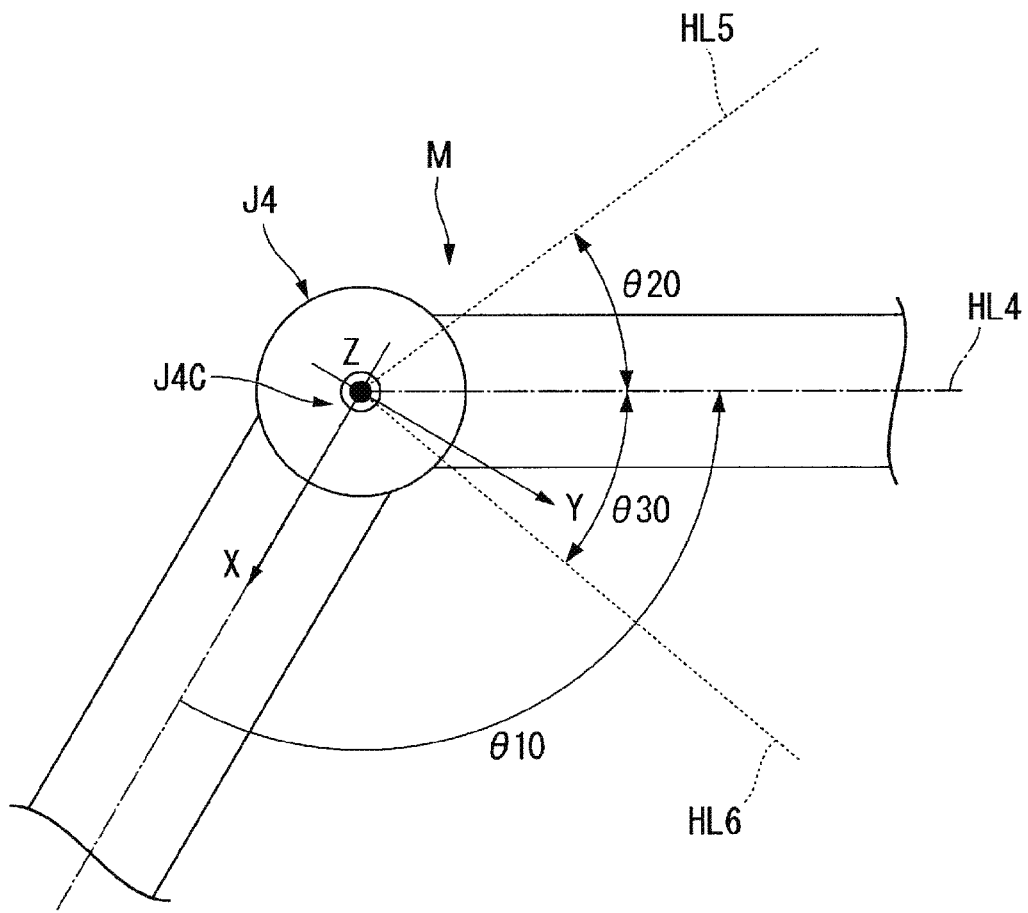
FIG. 10 shows an example of a fourth variable range calculated based on second threshold values designated on a W-axis of a joint coordinate system J4C.

FIG. 10 shows an example of the fourth variable range calculated based on the second threshold values designated on the W-axis of the joint coordinate system J4C. FIG. 10 shows a state of the joint J4 in the case where the control point T is allowed to coincide with the taught point P2 shown in FIG. 4. The joint coordinate system J4C shown in FIG. 10 is the joint coordinate system J4C associated with the joint J4 as described above. In the example shown in FIG. 10, the rotation angle of the joint J4 is a rotation angle θ10. An auxiliary line HL4 extending from the origin of the joint coordinate system J4C is an auxiliary line drawn for clearly showing the rotation angle θ10 of the joint J4 in the joint coordinate system J4C.

Here, in the example, a direction in which a line extending from the origin of the joint coordinate system J4C in parallel to the XY-plane of the joint coordinate system J4C indicates the position of the W-axis in the joint coordinate system J4C. As below, as an example, the case where a direction from the negative direction toward the positive direction of the X-axis of the joint coordinate system J4C indicates the origin of the W-axis will be explained. Note that the origin may be indicated by another direction instead. Further, in the case where the joint coordinate system J4C is seen from the positive direction toward the negative direction of the Z-axis in the joint coordinate system J4C, a direction rotating counterclockwise about the origin of the joint coordinate system J4C is the positive direction of the W-axis of the joint coordinate system J4C.

In the robot control apparatus 30, when the taught point P2 shown in FIG. 4 is designated as the next designated taught point, the joint coordinate system J4C is designated as the coordinate system desired by the user and the second threshold values of the W-axis of the joint coordinate system J4C are further designated with the taught point P2 based on the operation program input by the user in advance. The second threshold values are relative rotation angles from the rotation angle of the joint J4. Specifically, the second threshold values are respectively an upper limit value θ20 of the rotation angles in a rotation direction in which the rotation angle of the joint J4 increases from the rotation angle of the joint J4 and a lower limit value θ30 of the rotation angles in a rotation direction in which the rotation angle of the joint J4 decreases from the rotation angle of the joint J4. The robot control apparatus 30 calculates a range between the upper limit value θ20 and the lower limit value θ30 as the fourth variable range according to the joint coordinate system J4C based on the designated second threshold values. In the example shown in FIG. 10, the control values refer to the controlled rotation angle.

After the calculation of the fourth variable range, when an external force is applied to the hand H during the movement of the control point T from the taught point P1 to the taught point P2, the robot control apparatus 30 calculates the position and the attitude of the taught point V3 as the corrected taught point as described above. The robot control apparatus 30 calculates the rotation angle (i.e., the controlled rotation angle) of the joint J4 when the position and the attitude of the control point T are allowed to coincide with the calculated position and attitude and the rotation angle of the joint J4 when the position and the attitude of the control point T are allowed to coincide with the position and the attitude of the taught point P2. Then, the robot control apparatus 30 calculates a difference between the two rotation angles. The robot control apparatus 30 determines whether or not the calculated difference falls within the fourth variable range.

In the example shown in FIG. 10, the fourth variable range is a range (region) between the upper limit value θ20 of the rotation angles in a rotation direction in which the rotation angle of the joint J4 increases from the rotation angle of the joint J4 when the control point T coincides with the taught point P2 and the lower limit value θ30 of the rotation angles in a rotation direction in which the rotation angle of the joint J4 decreases from the rotation angle of the joint J4. In FIG. 10, an auxiliary line HL5 and an auxiliary line HL6 are drawn for clearly showing whether or not the difference falls within the fourth variable range. The auxiliary line HL5 is an auxiliary line extending from the origin of the joint coordinate system J4C and aligned with the auxiliary line HL4 when the auxiliary line HL4 is rotated about the origin by the upper limit value θ20 counterclockwise. The auxiliary line HL6 is an auxiliary line extending from the origin of the joint coordinate system J4C and aligned with the auxiliary line HL4 when the auxiliary line HL4 is rotated about the origin by the lower limit value θ30 clockwise.

The robot control apparatus 30 performs processing according to a determination result as to whether or not the difference falls within the fourth variable range. For example, if determining that the difference falls within the fourth variable range, the robot control apparatus 30 changes the designated taught point to the taught point V3 as the corrected taught point, and then, moves the control point T to allow the control point T to coincide with the taught point V3. Then, in the robot control apparatus 30, the taught point P3 as the taught point designated next based on the above described operation program is designated as the designated taught point. On the other hand, if determining that the difference does not fall within the fourth variable range, the robot control apparatus 30 performs e.g. abnormality processing as the predetermined processing.

Note that the abnormality processing may have a configuration of, when the robot control apparatus 30 moves the control point T to the corrected taught point, ensuring that the difference falls within the variable range indicated by the second threshold values such as a configuration of, if the difference exceeds the upper limit value of the W-axis designated as the second threshold value, recalculating the rotation angles of the respective joints of the manipulator M so that the difference may be the upper limit value and, if the difference exceeds the lower limit value of the W-axis designated as the second threshold value, recalculating the rotation angles so that the difference may be the lower limit value. In the case of recalculation of the rotation angles, the robot control apparatus 30 recalculates the rotation angles under a condition that the position and the attitude of the control point T coincide with the position and the attitude of the corrected taught point. Then, the robot control apparatus 30 rotates the respective joints of the manipulator M to realize the recalculated rotation angles and allows the control point T to coincide with the corrected taught point.

Figure 11:
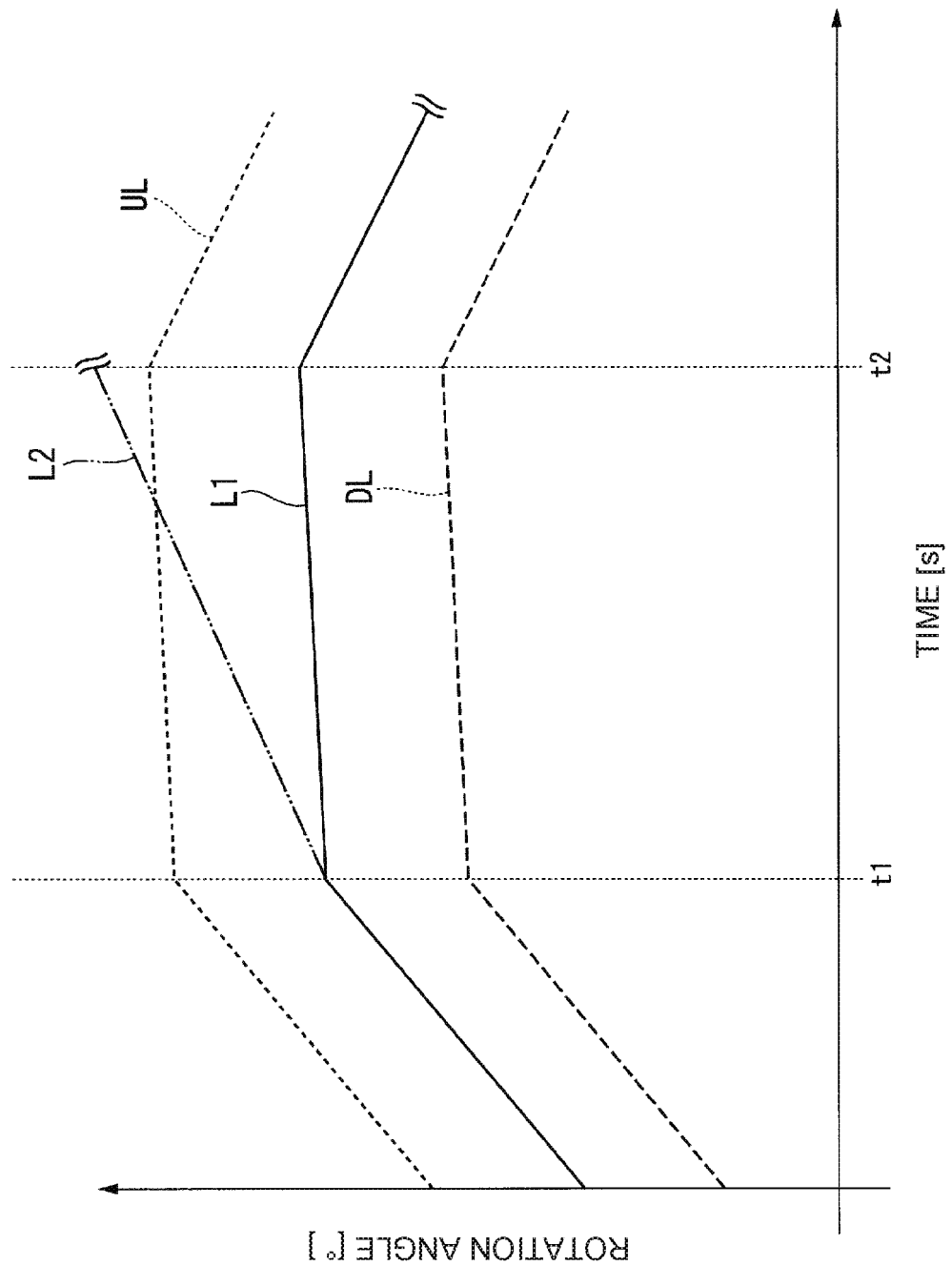
FIG. 11 shows an example of temporal changes of a rotation angle of a joint J4.

FIG. 11 shows an example of temporal changes of the rotation angle of the joint J4. The longitudinal axis of the graph indicates the rotation angle of the joint J4. The lateral axis of the graph indicates time. A curve L1 in the graph is a curve showing the temporal change of the rotation angle of the joint J4 in the case where the robot control apparatus 30 allows the control point T to sequentially coincide with the taught point P1, the taught point P2, the taught point P3 shown in FIG. 4. A curve UL shown in FIG. 11 is a curve relatively separated in rotation angle from the curve L1 by the upper limit value θ20. That is, the curve UL shows the temporal change of the upper limit value that changes with the temporal change of the rotation angle of the joint J4 in the case. The upper limit value is a value indicating the upper limit value θ20 expressed as the relative rotation angle from the rotation angle as the rotation angle from the origin of the W-axis of the joint coordinate system J4C. Further, a curve DL shown in FIG. 11 is a curve relatively separated in rotation angle from the curve L1 by the lower limit value θ30. That is, the curve DL shows the temporal change of the lower limit value that changes with the temporal change of the rotation angle of the joint J4 in the case. The lower limit value is a value indicating the lower limit value θ30 expressed as the relative rotation angle from the rotation angle as the rotation angle from the origin of the W-axis of the joint coordinate system J4C.

A time t1 shown in FIG. 11 is a time when the robot control apparatus 30 allows the control point T to coincide with the taught point P1. Further, a time t2 shown in FIG. 11 is a time when an estimated movement time estimated to be taken for the robot control apparatus 30 to move the control point T from the taught point P1 to the taught point P2 elapses.

A curve L2 shown in FIG. 11 shows the temporal change of the rotation angle of the joint J4 of the manipulator M when the robot control apparatus 30 allows the control point T to coincide with the corrected taught point from the taught point P1 by the force control, in the case where the corrected taught point and the control point T coincide. As shown in FIG. 11, when the curve L2 crosses the curve UL from downside toward upside, the rotation angle is no longer within the variable range calculated by the robot control apparatus 30 based on the second threshold values. In this case, the robot control apparatus 30 performs e.g. abnormality processing as the predetermined processing.

Figure 12:
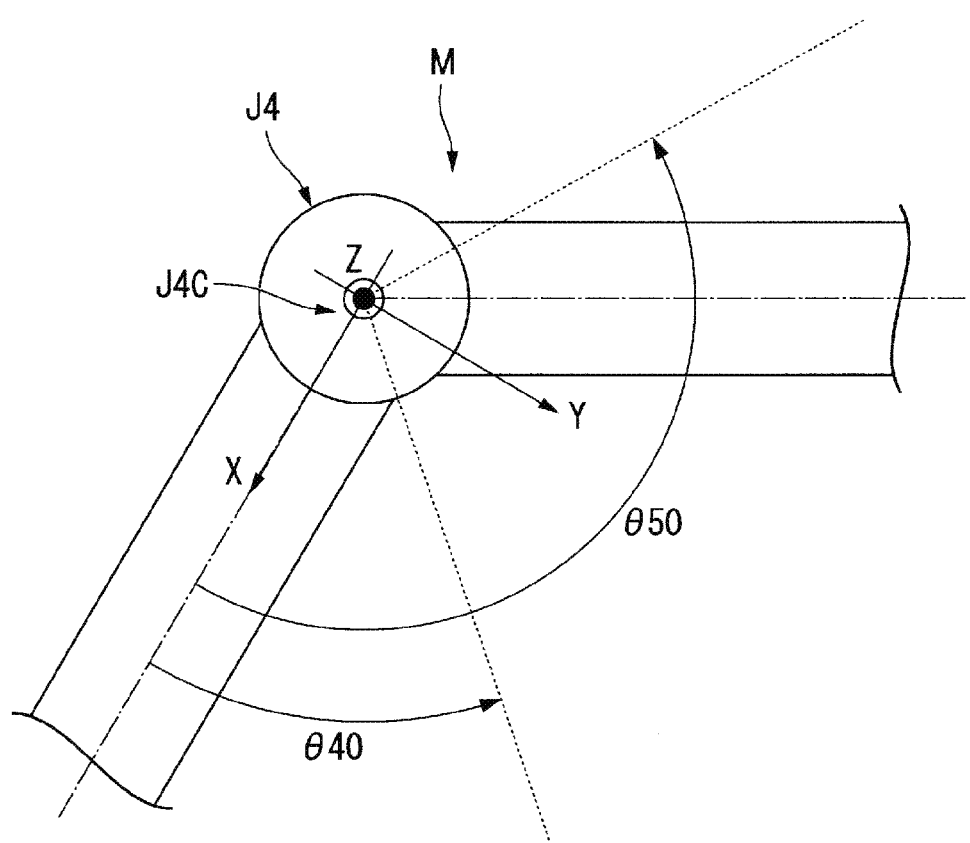
FIG. 12 shows another example of the fourth variable range calculated based on the second threshold values designated on the W-axis of the joint coordinate system J4C.

FIG. 12 shows another example of the fourth variable range calculated based on the second threshold values designated on the W-axis of the joint coordinate system J4C. FIG. 12 shows a state of the joint J4 in the case where the control point T is allowed to coincide with the taught point P2 shown in FIG. 4.

In the robot control apparatus 30, when the taught point P2 shown in FIG. 4 is designated as the next designated taught point, the joint coordinate system J4C is designated as the coordinate system desired by the user and the second threshold values of the W-axis of the joint coordinate system J4C are further designated with the taught point P2 based on the operation program input by the user in advance. The second threshold values are respectively an upper limit value θ40 and a lower limit value θ50 of the rotation angles of the joint J4. The robot control apparatus 30 calculates a range between the upper limit value θ40 and the lower limit value θ50 as the fourth variable range according to the joint coordinate system J4C based on the designated second threshold values. In the example, the control values refer to the controlled rotation angle.

After the calculation of the fourth variable range, when an external force is applied to the hand H during the movement of the control point T from the taught point P1 to the taught point P2, the robot control apparatus 30 calculates the position and the attitude of the taught point V3 as the corrected taught point as described above. The robot control apparatus 30 calculates the rotation angle (i.e., the controlled rotation angle) of the joint J4 when the position and the attitude of the control point T are allowed to coincide with the calculated position and attitude. Then, the robot control apparatus 30 determines whether or not the calculated rotation angle falls within the fourth variable range. The robot control apparatus 30 performs processing according to a determination result as to whether or not the rotation angle falls within the fourth variable range. For example, if determining that the rotation angle falls within the fourth variable range, the robot control apparatus 30 changes the designated taught point to the taught point V3 as the corrected taught point, and then, moves the control point T to allow the control point T to coincide with the taught point V3. Then, in the robot control apparatus 30, the taught point P3 as the next taught point is designated as the designated taught point based on the above described operation program. On the other hand, if determining that the rotation angle does not fall within the variable range, the robot control apparatus 30 performs e.g. abnormality processing as the predetermined processing.

Note that the abnormality processing may have a configuration of, when the robot control apparatus 30 moves the control point T to the corrected taught point, rotating the respective joints only within the variable range indicated by the second threshold values such as a configuration of, if the rotation angle exceeds the upper limit value of the W-axis designated as the second threshold value, recalculating the rotation angles of the respective joints of the manipulator M so that the rotation angle may be the upper limit value and, if the rotation angle exceeds the lower limit value of the W-axis designated as the second threshold value, recalculating the rotation angles so that the rotation angle may be the lower limit value. In the case of recalculation of the rotation angles, the robot control apparatus 30 recalculates the rotation angles under a condition that the position and the attitude of the control point T coincide with the position and the attitude of the corrected taught point. Then, the robot control apparatus 30 rotates the respective joints of the manipulator M to realize the recalculated rotation angles and allows the control point T to coincide with the corrected taught point.

The processing with respect to the joint coordinate system described in the example can be applied to impedance control with respect to each joint desired by the user. The impedance control refers to control of rotating the joints desired by the user according to an external force applied to the hand H. In the impedance control of the joints, it is difficult to grasp the rotation angles of the joints from the position and the attitude of the control point T. Accordingly, the processing is effective for e.g. restriction of the rotations of the joints in the impedance control of the joints. In other words, the robot control apparatus 30 performs the processing, and thereby, the user may easily restrict the rotations of the joints.

Flow of Processing by Robot Control Apparatus

Figure 13:
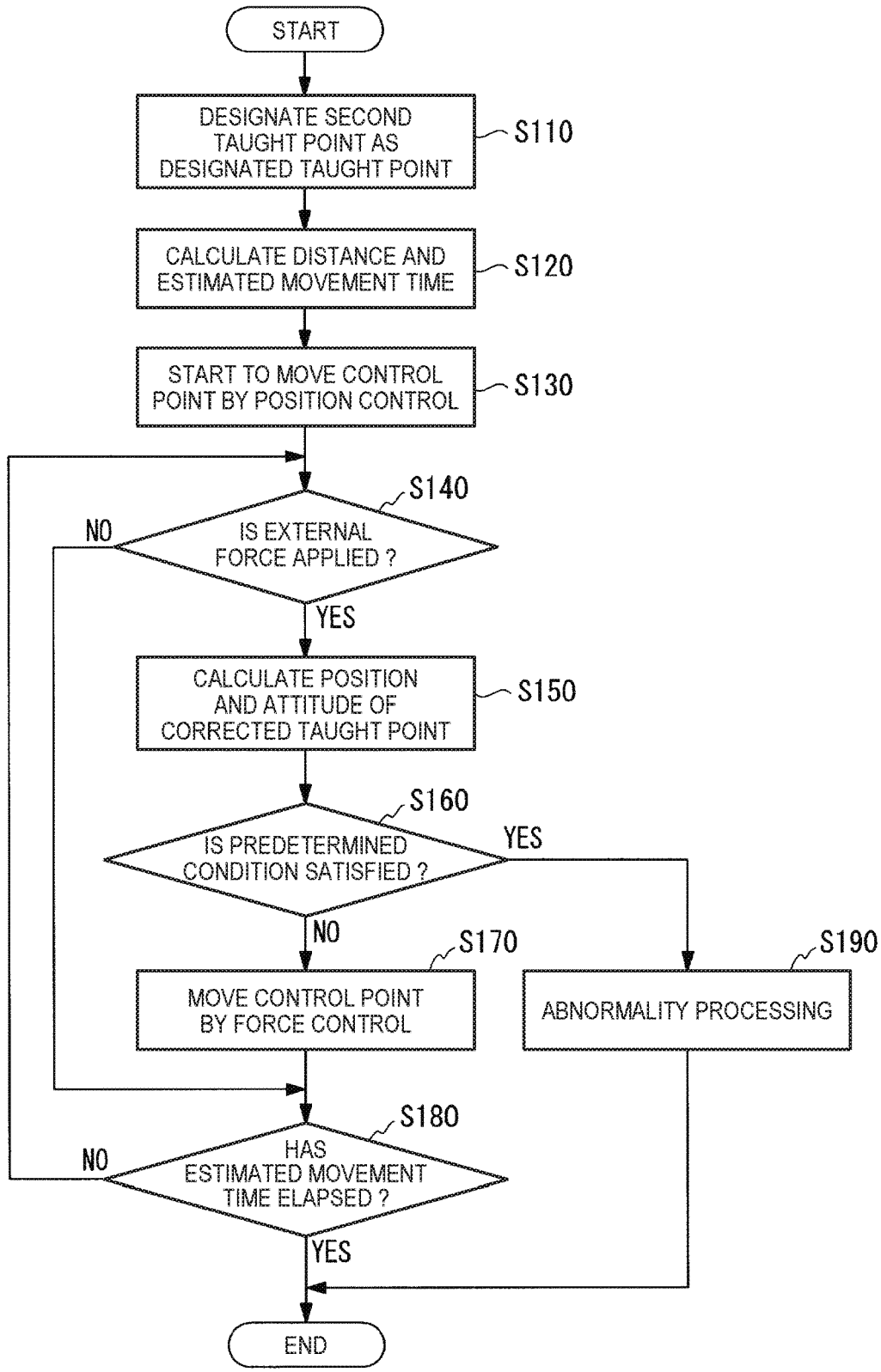
FIG. 13 is a flowchart showing an example of a flow of processing performed by the robot control apparatus 30.

As below, referring to FIG. 13, a flow of the processing performed by the robot control apparatus 30 will be explained. FIG. 13 is a flowchart showing an example of a flow of processing performed by the robot control apparatus 30. The robot control apparatus 30 performs the processing from step S110 to step S190 shown in FIG. 13 with respect to each of all combinations included in the sequentially designated taught points of the first taught point and the second taught point as two taught points in the sequential order. Further, in the flowchart shown in FIG. 13, the case where the control point T and the first taught point coincide before the processing at step S110 is started.

In the robot control part 363, the second taught point is designated as the designated taught point and the speed at which the control point T is moved, the coordinate system desired by the user, and the threshold values with respect to each axis according to the coordinate system are designated based on the operation program input by the user in advance (step S110). Then, the robot control part 363 calculates part or all of the above described variable ranges (first variable range to fourth variable range) based on the designated coordinate system and threshold values. Then, the robot control part 363 calculates a distance between the position of the first taught point and the position of the second taught point. Then, the robot control part 363 calculates an estimated movement time based on the calculated distance and the speed designated at step S110 (step S120).

Next, the robot control part 363 starts movement of the control point T to the second taught point by the position control (step S130). Then, the robot control part 363 acquires the force detection information from the force detection unit 21. Then, the robot control part 363 determines whether or not an external force has been applied to the hand H based on detection values contained in the acquired force detection information (step S140).

If determining that an external force is not applied to the hand H (step S140—NO), the robot control part 363 determines whether or not the estimated movement time calculated at step S120 has elapsed after the start of the movement of the control point T at step S130 to the present (step S180). If determining that the estimated movement time has elapsed (step S180—YES), the robot control part 363 ends the processing. On the other hand, if determining that the estimated movement time has not elapsed (step S180—NO), the robot control part 363 transitions to step S140 and determines whether or not an external force has been applied to the hand H again.

If determining that an external force is applied to the hand H (step S140—YES), the robot control part 363 calculates the position and the attitude of the corrected taught point based on the force detection values contained in the force detection information acquired at step S140 (step S150). Then, the robot control part 363 determines whether or not the control values including the position and the attitude of the corrected taught point calculated at step S150 satisfy a predetermined condition (step S160). In the example, the predetermined condition is to satisfy at least one of the following four conditions 1) to 4).

1) In the case where the taught point coordinate system is designated as the coordinate system desired by the user at step S110 and the first threshold values are designated on at least one of the X-axis, Y-axis, Z-axis of the taught point coordinate system at step S110, the controlled position does not fall within the first variable range calculated at step S110;

2) In the case where the taught point coordinate system is designated as the coordinate system desired by the user at step S110 and the first threshold values are designated on at least one of the U-axis, V-axis, W-axis of the taught point coordinate system at step S110, the controlled attitude does not fall within the second variable range calculated at step S110;

3) In the case where the robot coordinate system RC is designated as the coordinate system desired by the user at step S110 and the third threshold values are designated on at least one of the X-axis, Y-axis, Z-axis, U-axis, V-axis, W-axis of the robot coordinate system RC at step S110, the controlled position does not fall within the third variable range calculated at step S110

4) In the case where a certain joint coordinate system is designated as the coordinate system desired by the user at step S110 and the second threshold values are designated on the W-axis of the joint coordinate system at step S110, a difference between the controlled rotation angle as the control values for rotating the joint associated with the joint coordinate system and the rotation angle of the joint when the position and the attitude of the control point T are allowed to coincide with the position and the attitude of the second taught point does not fall within the fourth variable range calculated at step S110. Note that the controlled rotation angle is a rotation angle when the position and the attitude of the control point T are allowed to coincide with the position and the attitude calculated at step S150

If determining that the control values satisfy the predetermined condition (step S160—YES), the robot control part 363 executes e.g. abnormality processing as the predetermined processing (step S190) and ends the processing. On the other hand, if determining that the control values do not satisfy the predetermined condition (step S160—NO), the robot control part 363 moves the control point T and allows the position and the attitude of the control point T to coincide with the position and the attitude of the corrected taught point calculated at step S150 (step S170). Then, the robot control part 363 transitions to step S180 and determines whether or not the estimated movement time calculated at step S120 has elapsed after the start of the movement of the control point T at step S130 to the present.

As described above, the threshold values are designated with respect to each axis according to the coordinate system for the control values for operating the robot 20, and the robot control apparatus 30 allows the robot 20 to perform the operation based on the control values and the threshold values. Thereby, the robot control apparatus 30 may allow the robot to perform the operations according to each axis of the coordinate system.

Another Example of Determination Method of Robot Control Part

As below, referring to FIG. 14, another example of the determination method performed by the robot control part 363 in the processing at step S160 shown in FIG. 13 will be explained. As below, as an example, the determination method as to whether or not the rotation angle of the joint J4 satisfies a predetermined condition will be explained. Note that, with respect to the other control values at step S160, the robot control part 363 may have a configuration of determining whether or not the control values satisfy the predetermined condition using the same determination method as the determination method to be described later or a configuration of determining whether or not the control values satisfy the predetermined condition using other determination methods.

Figure 14:
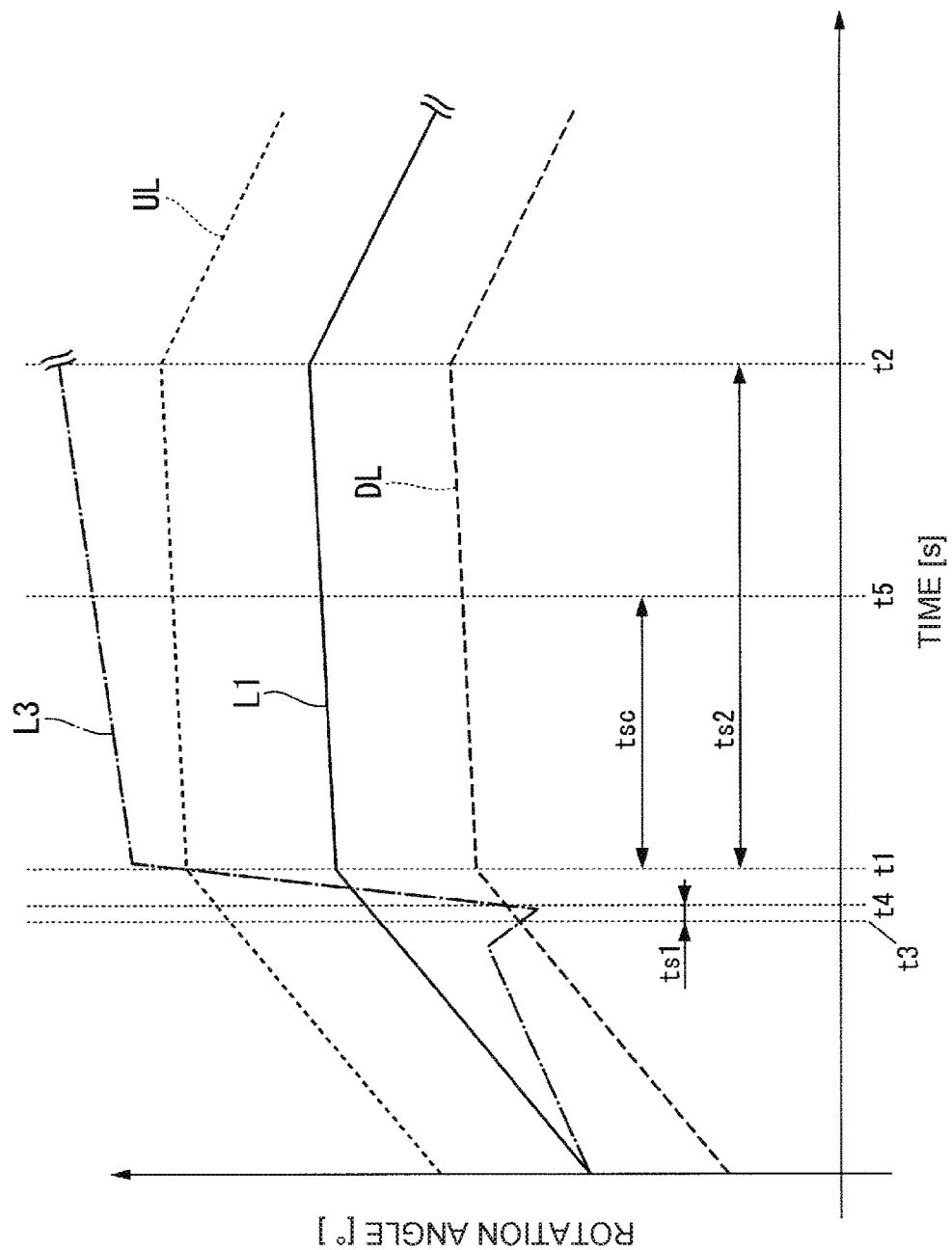
FIG. 14 shows another example of temporal changes of the rotation angle of the joint J4.

FIG. 14 shows another example of the temporal changes of the rotation angle of the joint J4. The longitudinal axis of the graph shown in FIG. 14 indicates the rotation angle of the joint J4. The lateral axis of the graph indicates time. Note that a curve L1, curve UL, curve DL, the time t1, time t2 shown in FIG. 14 are the same as the curve L1, curve UL, curve DL, time t1, time t2 shown in FIG. 11, respectively, and the explanation will be omitted.

A curve L3 shown in FIG. 14 shows the temporal change of the rotation angle of the joint J4 when the robot control apparatus 30 allows the control point T to coincide with the taught point P1 by the force control in the case where the corrected taught point and the control point T coincide. As shown in FIG. 14, the rotation angle is no longer within the fourth variable range calculated by the robot control apparatus 30 based on the second threshold values at a time ts1 between the time t3 and the time t4. Further, the rotation angle is no longer within the fourth variable range at a time ts2 between the time t1 and the time t2.

If the rotation angle does not fall within the fourth variable range for a predetermined time tsc or more, the robot control part 363 determines that the rotation angle does not fall within the fourth variable range. On the other hand, if the rotation angle does not fall within the fourth variable range for less than the predetermined time tsc, the part determines that the rotation angle falls within the fourth variable range. In the example shown in FIG. 14, a time at which the predetermined time tsc has elapsed from the time t1 is a time t5. In other words, the robot control part 363 determines that the rotation angle does not fall within the fourth variable range at the time t5. On the other hand, the time ts1 is a time less than the predetermined time tsc. In other words, the robot control part 363 determines that the rotation angle falls within the fourth variable range at the time t4.

As described above, the robot control apparatus 30 allows the robot 20 to perform the operation based on the control values and the threshold values if the control value continues to exceed the threshold value for the predetermined time or more. Thereby, the robot control apparatus 30 may allow the robot 20 to perform different operations before and after the control value continues to exceed the threshold value.

Specific Example of Processing by Robot Control Apparatus Based on Control Values and Variable Ranges in Predetermined Work As below, referring to FIG. 15, a specific example of processing performed by the robot control apparatus 30 based on the control values and the variable ranges in the predetermined work will be explained.

Figure 15:
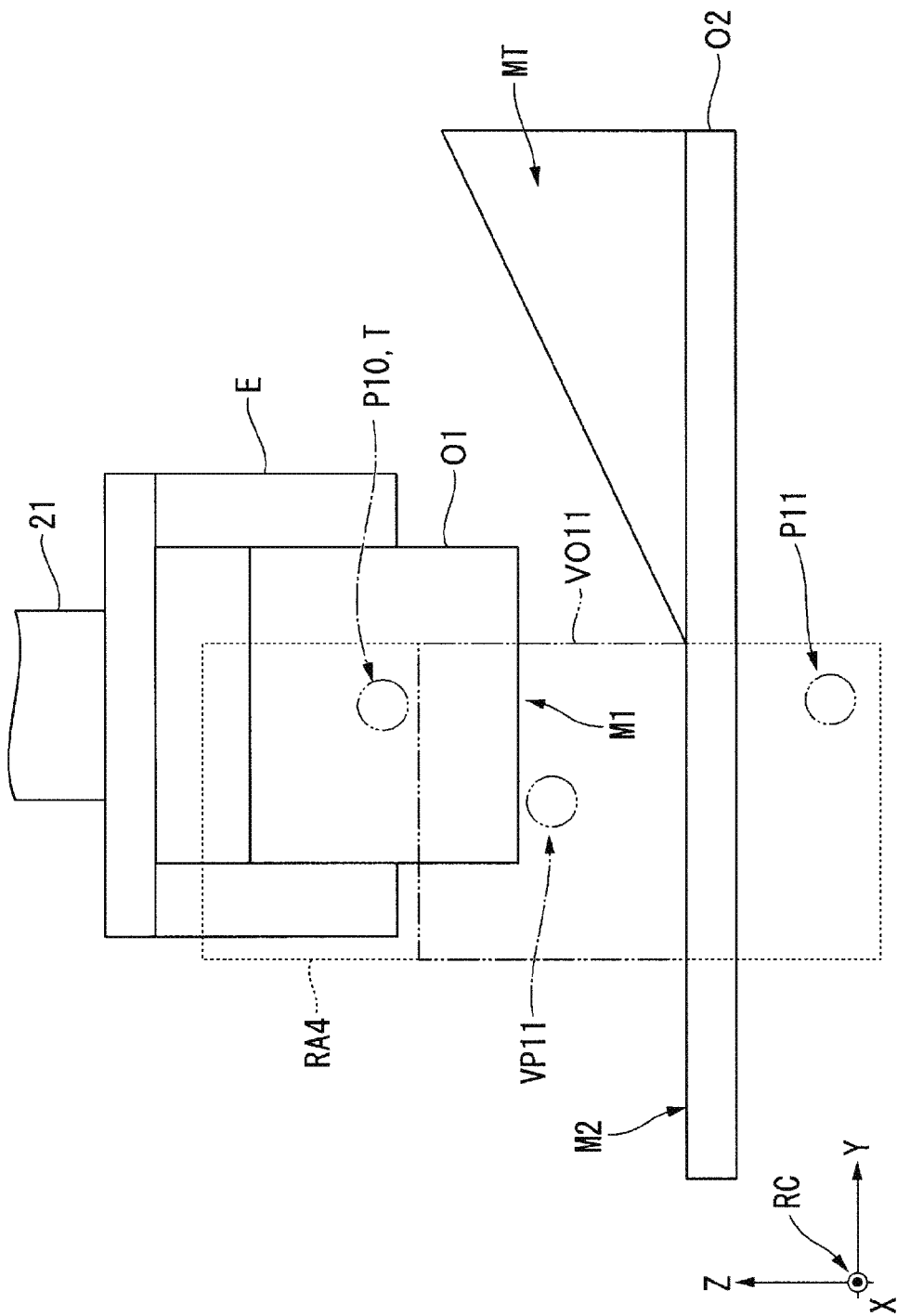
FIG. 15 shows an example of a relative position relationship between a hand H and a second object O2 at a time before a robot 20 brings a first surface M1 of a first object O1 into surface contact with a second surface M2 of the second object O2 in a predetermined work.

FIG. 15 shows an example of a relative position relationship between the hand H and the second object O2 at a time before the robot 20 brings the first surface M1 of the first object O1 into surface contact with the second surface M2 of the second object O2 in the predetermined work. Further, FIG. 15 is a side view when the hand H and the second object O2 are seen from the positive direction toward the negative direction of the Z-axis in the robot coordinate system. RC. In the example shown in FIG. 15, in the case, an object MT is placed in a part of a half of the upper surface of the second object O2 on the positive direction side of the Y-axis of the robot coordinate system RC. The object MT is an object having a triangular prism shape with an inclined surface in the case. The inclined surface is an inclined surface having a height lower from the positive direction side toward the half position.

A taught point P10 is a taught point with which the control point T coincides at the present. A taught point P11 is a designated taught point designated in the robot control apparatus 30. The robot control apparatus 30 moves the control point T by the position control and allows the control point T that has coincided with the taught point P10 to coincide with the taught point P11. However, in the example shown in FIG. 15, a part of the inclined surface of the object MT enters into a space between the first surface M1 of the first object O1 and the second surface M2 of the second object O2. That is, when the robot control apparatus 30 moves the control point T to coincide the control point T with the taught point P11, the first object O1 comes into contact with the object MT and an external force is applied from the object MT.

The robot control apparatus 30 calculates the corrected taught point by the force control based on the external force applied from the object MT to the first object O1. Then, the robot control apparatus 30 changes the designated taught point to the calculated corrected taught point, and then, moves and allows the control point T to coincide with the corrected taught point. A taught point VP11 shown in FIG. 15 is a corrected taught point calculated by the force control based on the external force applied from the object MT to the first object O1. Further, a contour VO11 is a contour of the first object O1 when the robot control apparatus 30 allows the control point T to coincide with the corrected taught point by the force control.

As described above, when the robot control apparatus 30 allows the robot 20 to operate, for example, the robot control apparatus 30 calculates a first variable range RA4 based on the operation program input by the user in advance. Note that, in the example shown in FIG. 15, the case where the variable range is only the first variable range RA4 is explained, however, not limited to that. The variable range may be part or all of the first variable range to fourth variable range.

When moving the control point T by the force control, the robot control apparatus 30 continues to move the control point T toward the taught point P11 as long as the determination that the position of the control point T falls within the first variable range RA4 shown in FIG. 15 is made. Then, the robot control apparatus 30 determines that the predetermined work is completed and stops the movement of the control point T when the force applied in the positive direction of the Z-axis of the force detection coordinate system of the force detection values contained in the force detection information acquired from the force detection unit 21 is equal to or more than a predetermined value, the forces applied in the X-axis direction and the Y-axis direction of the force detection coordinate system are zero, and the moment applied in the U-axis direction, V-axis direction, W-axis direction of the force detection coordinate system are zero. On the other hand, the robot control apparatus 30 performs e.g. abnormality processing as the predetermined processing if determining that the position of the control point T does not fall within the first variable range RA4 shown in FIG. 15.

Further, in the example shown in FIG. 15, a distance from the taught point P10 to an end on the positive direction side of the Y-axis in the robot coordinate system RC of ends of the first variable range RA is shorter than a distance from the taught point P10 to an end on the negative direction side of the Y-axis in the robot coordinate system RC of the ends of the first variable range RA. This results from the input of the operation program by the user such that the robot control apparatus 30 may not move the control point T to the positive direction side when an external force is applied to the first object O1 from another factor than the object MT in the example illustrated in FIG. 15. That is, the robot control apparatus calculates the first variable range RA4 based on the designated coordinate system and the designated first threshold values based on the operation program.

A below, referring to FIG. 16, a specific example of processing performed by the robot control apparatus 30 based on the control values and the variable ranges in the predetermined work will be explained.

Figure 16:
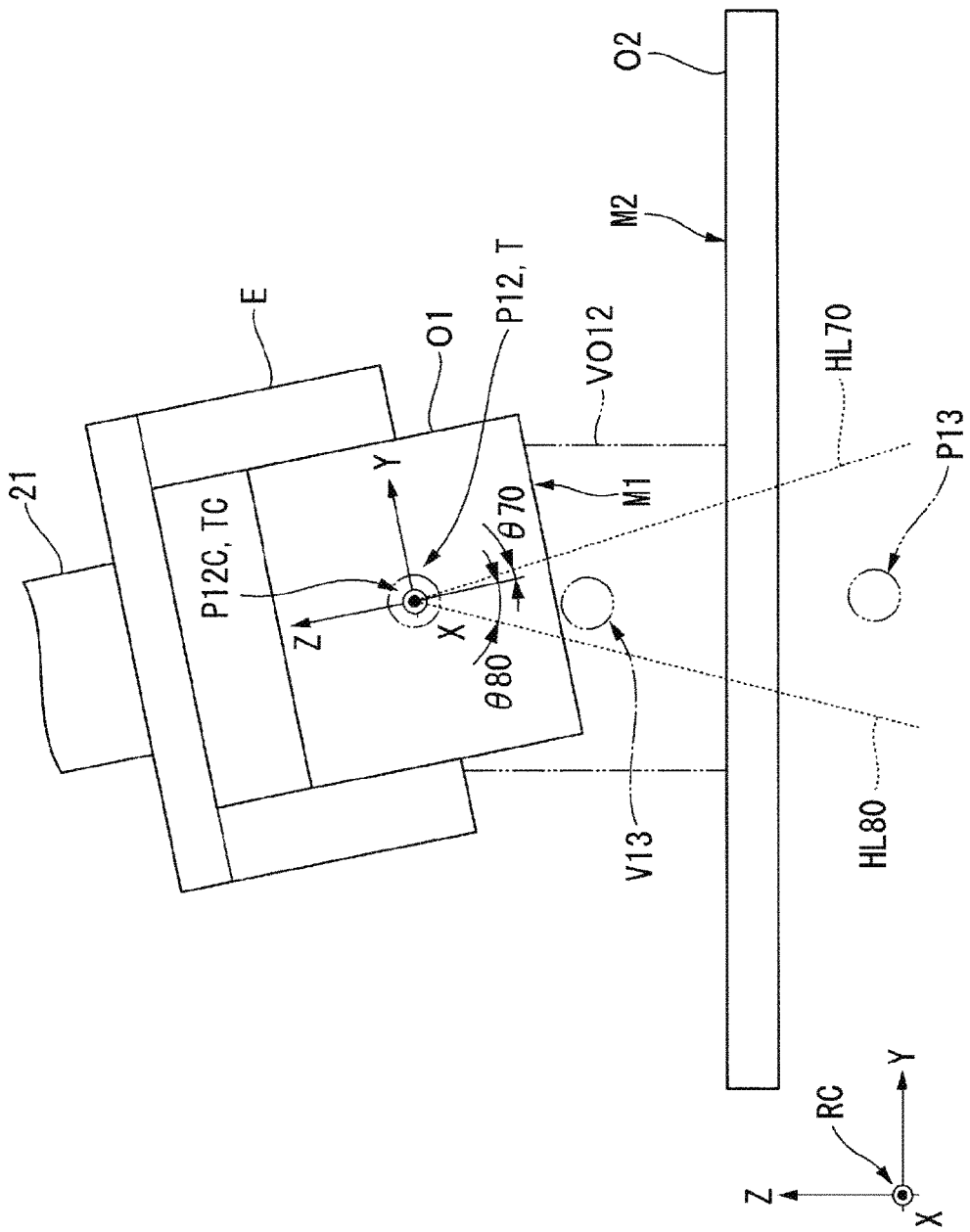
FIG. 16 shows another example of the relative position relationship between the hand H and the second object O2 at the time before the robot 20 brings the first surface M1 of the first object O1 into surface contact with the second surface M2 of the second object O2 in the predetermined work.

FIG. 16 shows another example of the relative position relationship between the hand H and the second object O2 at the time before the robot 20 brings the first surface M1 of the first object O1 into surface contact with the second surface M2 of the second object O2 in the predetermined work. Further, FIG. 16 is a side view when the hand H and the second object O2 are seen from the positive direction toward the negative direction of the Z-axis in the robot coordinate system RC.

A taught point P12 is a taught point with which the control point T coincides at the present. A taught point coordinate system P12C is a taught point coordinate system associated with the taught point P12. A taught point P13 is a designated taught point designated in the robot control apparatus 30. The robot control apparatus 30 moves the control point T by the position control and allows the control point T that has coincided with the taught point P12 to coincide with the taught point P13. However, in the example shown in FIG. 16, the first surface M1 of the first object O1 and the second surface M2 of the second object O2 are not parallel, but tilt with respect to each other. That is, the attitude of the control point T tilts in the U-axis direction of the control point coordinate system TC with respect to the attitude of the control point T shown in FIG. 15. Thereby, when the robot control apparatus 30 moves the control point T to coincide the control point T with the taught point P13, a part of the first object O1 comes into contact with the second surface M2 of the second object O2 and an external force is applied from the second surface M2.

The robot control apparatus 30 calculates the corrected taught point by the force control based on the external force applied from the second surface M2 to the part. Then, the robot control apparatus 30 changes the designated taught point to the calculated corrected taught point, and then, moves and allows the control point T to coincide with the corrected taught point. A taught point V13 shown in FIG. 16 is a corrected taught point calculated by the robot control apparatus 30 based on the force control based on the external force applied from the second surface M2 to the part. Further, a contour VO12 is a contour of the first object O1 when the robot control apparatus 30 allows the control point T to coincide with the corrected taught point by the force control.

As described above, when the robot control apparatus 30 allows the robot 20 to operate, for example, in the robot control apparatus 30, first threshold values are designated on the U-axis of the taught point coordinate system P12C as the designated coordinate system based on the operation program input by the user in advance. The first threshold values are respectively an upper limit value θ70 and a lower limit value θ80 of the U-axis. The robot control apparatus 30 calculates a second variable range according to the taught point coordinate system P12C based on the designated first threshold values. In the example, the second variable range is a range (region) between an auxiliary line HL70 and an auxiliary line HL80 when the hand H and the second object O2 are seen from the positive direction toward the negative direction of the Z-axis in the robot coordinate system RC. The auxiliary line HL70 is a line aligned with the Z-axis of the taught point coordinate system P12C when the taught point coordinate system P12C is rotated counterclockwise by the upper limit value θ70 around the X-axis of the taught point coordinate system P12C. The auxiliary line HL80 is a line aligned with the Z-axis of the taught point coordinate system P12C when the taught point coordinate system P12C is rotated clockwise by the lower limit value θ80 around the X-axis of the taught point coordinate system P12C. Note that, in the example shown in FIG. 16, the case where the variable range is only the second variable range is explained, however, not limited to that. The variable range may be part or all of the first variable range to fourth variable range.

After the calculation of the second variable range, when an external force is applied to the hand H during the movement of the control point T from the taught point P12 to the taught point P13, the robot control apparatus 30 calculates the position and the attitude of the taught point V13 as the corrected taught point as described above. The robot control apparatus 30 calculates a difference between the attitude of the calculated position and attitude and the attitude of the taught point P12. Then, the robot control apparatus 30 calculates a difference between the two rotation angles. The robot control apparatus 30 determines whether or not the calculated difference falls within the second variable range.

When moving the control point T by the force control, the robot control apparatus 30 continues to move the control point T toward the taught point V13 as long as the determination that the difference falls within the second variable range is made. Then, the robot control apparatus 30 determines that the predetermined work is completed and stops the movement of the control point T when the force applied in the positive direction of the Z-axis of the force detection coordinate system of the force detection values contained in the force detection information acquired from the force detection unit 21 is equal to or more than a predetermined value, the forces applied in the X-axis direction and the Y-axis direction of the force detection coordinate system is zero, and the moment applied in the U-axis direction, V-axis direction, W-axis direction of the force detection coordinate system are zero. On the other hand, the robot control apparatus 30 performs e.g. abnormality processing as the predetermined processing if determining that the difference does not fall within the second variable range.

Further, in the example shown in FIG. 16, the absolute value of the upper limit value θ70 is larger than the absolute value of the lower limit value θ80. This results from the input of the operation program by the user such that the robot control apparatus 30 may not rotate the control point T in the direction in which the angle between the first surface M1 of the first object O1 and the second surface M2 of the second object O2 becomes larger when an external force is applied to the first object O1 from another factor than the second object O2 in the example illustrated in FIG. 16.

Another Example of Shape of First Variable Range

Figure 17:
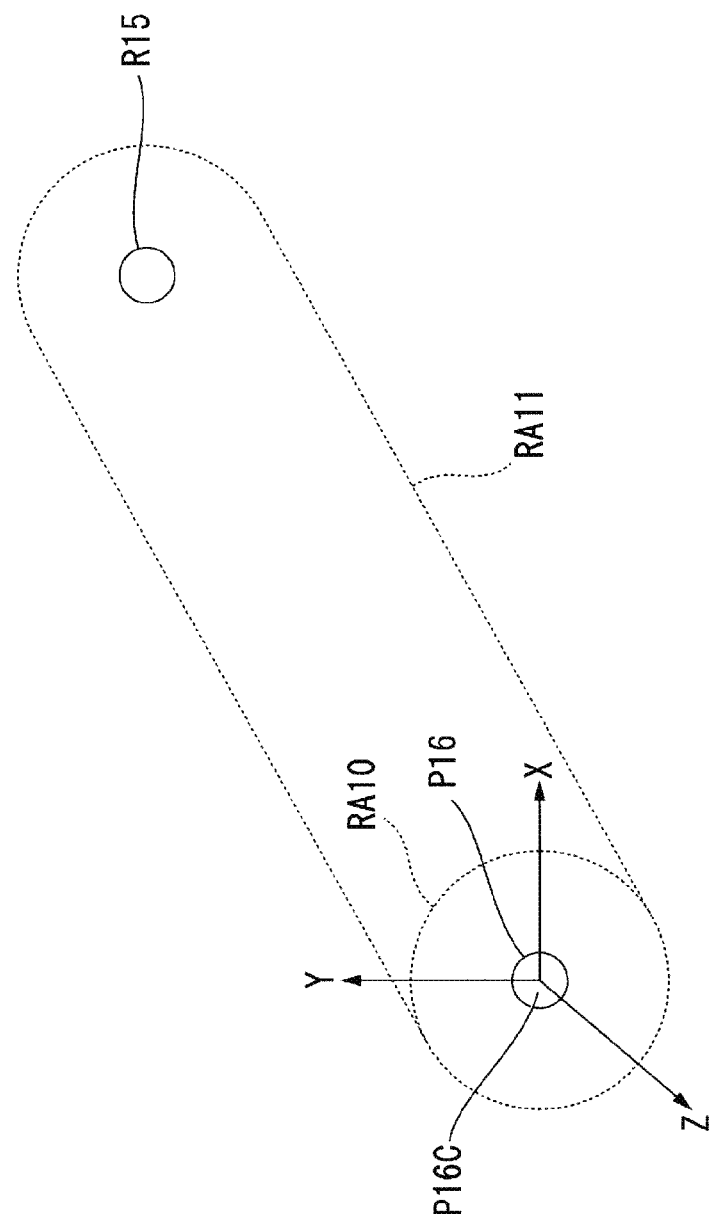
FIG. 17 shows an example of a first variable range calculated based on a circular provisional variable range.

As below, referring to FIG. 17, another example of the shape of the first variable range will be explained. As described above, the shape of the provisional variable range used by the robot control apparatus 30 for calculation of the first variable range may be a circular shape that pass through the respective first threshold values designated in the robot control apparatus 30 like a provisional variable range RA10 shown in FIG. 17. FIG. 17 shows an example of the first variable range calculated based on a circular provisional variable range.

A taught point P15 shown in FIG. 17 is a taught point with which the control point T coincides at the present. A taught point P16 is a designated taught point designated in the robot control apparatus 30. In the robot control apparatus 30, based on the operation program input by the user in advance, the first threshold values are designated on an X-axis and a Y-axis of a taught point coordinate system P16C associated with the taught point P16 so that the provisional variable range may have a circular shape on the XY-plane of the taught point coordinate system P16C. For example, in the robot control apparatus 30, when the first threshold values are designated, a condition of constraint between the first threshold values of the X-axis and the first threshold values of the Y-axis is designated. The condition of constraint is that the position of the X-axis in which the first threshold values of the X-axis fall within a designated range and the position of the Y-axis in which the first threshold values of the Y-axis fall within a designated range are solutions of an equation of a circle. Note that, in the case where the provisional variable range has a different shape from the circular shape, the condition of constraint may be another condition. The robot control apparatus 30 calculates a first variable range RA11 according to the method described as above based on the calculated provisional variable range RA10.

As described above, the condition of constraint is designated for the designated first threshold values, and thereby, the robot control apparatus 30 may calculate provisional threshold values of a shape according to the designated condition of constraint. Note that, in FIG. 17, the case where the condition of constraint is designated for the first threshold values in the robot control apparatus 30 is explained, however, a condition of constraint may be designated for the third threshold values, not limited to that. Further, in FIG. 17, the configuration in which the first threshold values are designated with respect to the X-axis and the Y-axis of the taught point coordinate system P16C in the robot control apparatus 30 is explained, however, a configuration in which the first threshold values are designated with respect to part or all of the X-axis, Y-axis, Z-axis, U-axis, V-axis, and W-axis of the taught point coordinate system P16C in the robot control apparatus 30 instead.

Modified Examples of Embodiment

In the above description, the predetermined processing is the abnormality processing. However, the predetermined processing may be other processing in place of the abnormality processing. For example, the predetermined processing may be other processing such as processing by the robot control apparatus 30 determining that predetermined work is completed and allowing the robot 20 to perform the next work different from the predetermined work. Thereby, the robot control apparatus 30 may allow the robot to perform an operation by the processing different from the abnormality processing.

Further, the abnormality processing in the above description may be processing by the robot control apparatus 30 displaying an error on the display unit 35, processing by the robot control apparatus 30 emitting a sound from a speaker (not shown), processing by the robot control apparatus 30 ending the operation, or other processing.

The robot control apparatus 30 may be adapted to display a GUI (Graphical User Interface) (not shown) on the display unit 35 and receive input of threshold values with respect to each axis according to the respective coordinate systems by the user from the GUI.

Further, the robot control apparatus 30 may be adapted to display a trajectory of the movement of the control point T by the position control calculated based on the operation program and the taught point information on the display unit 35. In this case, the display of the trajectory may be three-dimensional display or two-dimensional display.

The display unit 35 may be a head mount display.

When correcting a target to move the control point T by the position control according to a captured image captured by an imaging unit like visual servo or the like, the robot control apparatus 30 may be adapted to change or restrict the position and the attitude of the control point T at the corrected target using the variable range described as above.

In the above described manner, the range is designated for the control values for operating the robot 20 by the force control, and the robot control apparatus 30 allows the robot 20 to perform an operation based on the control values and the range. Thereby, the robot control apparatus 30 may allow the robot 20 to perform an operation according to the designated range.

The threshold values are designated with respect to each axis according to the coordinate system for the control values for operating the robot 20, and the robot control apparatus 30 allows the robot 20 to perform an operation based on the control values and the range designated by the designated threshold values. Thereby, the robot control apparatus 30 may allow the robot 20 to perform the operation according to each axis of the coordinate system.

In the robot control apparatus 30, the first threshold values are designated as the threshold values with respect to each axis according to the taught point coordinate system. Thereby, the robot control apparatus 30 may allow the robot 20 to perform an operation according to each axis of the taught point coordinate system.

In the robot control apparatus 30, the different first threshold values are designated with respect to each taught point. Thereby, the robot control apparatus 30 may allow the robot 20 to perform an operation based on the different first threshold values with respect to each taught point. Further, even when the contents of the predetermined work are changed, the robot control apparatus 30 may easily change the first threshold values.

The robot control apparatus 30 allows the robot 20 to perform an operation based on the first threshold values that define the space within the robot coordinate system RC as a space having the shape according to the trajectory formed by connecting the taught points with lines in the order of the taught points. Thereby, the robot control apparatus 30 may allow the robot 20 to perform different operations inside and outside of the space within the robot coordinate system RC defined by the control values and the first threshold values.

In the robot control apparatus 30, the second threshold values are designated as the threshold values according to each axis of the joint coordinate system. Thereby, the robot control apparatus 30 may allow the robot 20 to perform an operation according to each axis of the joint coordinate system. As a result, the robot control apparatus 30 may change or restrict the rotations of the joints desired by the user based on the second threshold values. It is difficult to grasp the rotation angles of the joints from the position and the attitude of the control point T. Accordingly, the processing by the robot control apparatus 30 is effective processing when restricting the rotations of the joints desired by the user.

In the robot control apparatus 30, the third threshold values are designated as the threshold values with respect to each axis according to the robot coordinate system RC. Thereby, the robot control apparatus 30 may allow the robot 20 to perform an operation according to each axis of the robot coordinate system RC.

In the robot control apparatus 30, threshold values are designated on predetermined part of the axes according to the coordinate system. Thereby, the robot control apparatus 30 may allow the robot 20 to perform an operation according to the predetermined part of the axes of the coordinate system. As a result, for example, the robot control apparatus 30 may change or restrict the operation of the robot 20 only with respect to a direction desired by the user of the respective coordinate axis directions of a certain coordinate system. Further, for example, the robot control apparatus 30 may change or restrict the operation of the robot 20 with respect to one or both of the positive direction and the negative direction of a certain axis of a certain coordinate system.

When the control value continues to exceed the threshold value for the predetermined time or more, the robot control apparatus 30 performs the predetermined processing. Thereby, the robot control apparatus 30 may allow the robot 20 to respectively perform different operations before and after the control value continues to exceed the threshold value for the predetermined time or more. As a result, the robot control apparatus 30 may allow for the control values temporarily exceeding the threshold values due to disturbance and monitor the control values exceeding the threshold values by an unintended operation.

When the control value continues to exceed the threshold value for the predetermined time or more, the robot control apparatus 30 performs different processing from the abnormality processing. Thereby, the robot control apparatus 30 may allow the robot 20 to perform operations by different processing from the abnormality processing before and after the control value continues to exceed the threshold value for the predetermined time or more.

As above, the embodiment of the invention is described in detail with reference to the drawings. The specific configurations are not limited to the embodiment and changes, replacements, deletions, etc. may be made without departing from the scope of the invention.

A program for realizing a function of an arbitrary configuration part in the above described apparatus (e.g. the robot control apparatus 30) may be recorded in a computer-readable recording medium and the program may be read into a computer system and executed. Note that "computer system" here includes an OS (Operating System) and hardware such as a peripheral. Further, "computer-readable recording medium" refers to a portable medium such as a flexible disk, magnetooptical disk, ROM, CD (Compact Disk)-ROM and a storage device such as a hard disk built in the computer system. Furthermore, "computer-readable recording medium" includes a medium that holds a program in a fixed period such as a volatile memory (RAM) within the computer system serving as a server or client when the program is transmitted via a network such as the Internet or a communication line such as a phone line.

The program may be transmitted from the computer system in which the program is stored in a memory device or the like via a transmission medium or transmission wave within the transmission medium to another computer system. Here, "transmission medium" for transmission of the program refers to a medium having a function of transmitting information including a network (communication network) such as the Internet and a communication line such as a phone line.

Further, the program may realize part of the above described function. Furthermore, the program may realize the above described function in combination with a program that has been already recorded in the computer system, the so-called differential file (differential program).

The entire disclosure of Japanese Patent Application No. 2016-054960, filed Mar. 18, 2016 is expressly incorporated by reference herein.

What is claimed is:
1. A robot control apparatus comprising:
a control unit; and
a non-transitory computer readable storage medium storing thereon a computer program product executable by the control unit for controlling a robot, the computer program product including:
a robot control part that controls the robot; and
a force detection information acquisition part that acquires force detection information from a force detection unit, wherein
the robot control part, identifies a control point corresponding to a predetermined position of the robot, designates a range of control values relative to the control point for operating a robot by force control based on the force detection information and operates the robot based on the control values and the designated range,
the range is designated by threshold values with respect to each axis according to a coordinate system,
the control values include a position of the control point of the robot,
the coordinate system includes a taught point coordinate system indicating a position and an attitude with respect to each taught point with which the control point is allowed to coincide stored in advance, and
first threshold values are designated as the threshold values with respect to each axis according to the taught point coordinate system.

2. The robot control apparatus according to claim 1, wherein different first threshold values are designated with respect to each taught point.

3. The robot control apparatus according to claim 1, wherein a shape of a space within a robot coordinate system defined by the first threshold values is a shape according to a trajectory formed by connecting the taught points with lines in an order of the taught points.

4. The robot control apparatus according to claim 1, wherein the control values include a rotation angle of a joint of the robot,
the coordinate system includes a joint coordinate system indicating the rotation angle of the joint, and
second threshold values are designated as the threshold values with respect to each axis according to the joint coordinate system.

5. The robot control apparatus according to claim 1, wherein the coordinate system includes a robot coordinate system, and
third threshold values are designated as the threshold values with respect to each axis according to the robot coordinate system.

6. The robot control apparatus according to claim 1, wherein the threshold values are designated on predetermined part of the axes according to the coordinate system.

7. The robot control apparatus according to claim 1, wherein the robot control part performs predetermined processing when the control value continues to exceed the range for a predetermined time or more.

8. The robot control apparatus according to claim 7, wherein the predetermined processing is different processing from abnormality processing.

9. A robot controlled by a robot control apparatus, the robot control including:
a control unit; and
a non-transitory computer readable storage medium storing thereon a computer program product executable by the control unit for controlling a robot, the computer program product including:
a robot control part that controls a robot; and
a force detection information acquisition part that acquires force detection information from a force detection unit, wherein
the robot control part, identifies a control point corresponding to a predetermined position of the robot, designates a range of control values relative to the control point for operating a robot by force control based on the force detection information and operates the robot based on the control values and the designated range,
the range is designated by threshold values with respect to each axis according to a coordinate system,
the control values include a position of the control point of the robot,
the coordinate system includes a taught point coordinate system indicating a position and an attitude with respect to each taught point with which the control point is allowed to coincide stored in advance, and
first threshold values are designated as the threshold values with respect to each axis according to the taught point coordinate system.

10. The robot according to claim 9, wherein different first threshold values are designated with respect to each taught point.

11. The robot according to claim 9, wherein a shape of a space within a robot coordinate system defined by the first threshold values is a shape according to a trajectory formed by connecting the taught points with lines in an order of the taught points.

12. A robot system, comprising:
a robot control apparatus including:
a control unit; and
a non-transitory computer readable storage medium storing thereon a computer program product executable by the control unit for controlling a robot, the computer program product including:
a robot control part that controls a robot; and
a force detection information acquisition part that acquires force detection information from a force detection unit, wherein
the robot control part, identifies a control point corresponding to a predetermined position of the robot, designates a range of control values relative to the control point for operating a robot by force control based on the force detection information and operates the robot based on the control values and the designated range,
the range is designated by threshold values with respect to each axis according to a coordinate system,
the control values include a position of the control point of the robot,
the coordinate system includes a taught point coordinate system indicating a position and an attitude with respect to each taught point with which the control point is allowed to coincide stored in advance, and
first threshold values are designated as the threshold values with respect to each axis according to the taught point coordinate system; and
a robot controlled by the robot control apparatus.

13. The robot system according to claim 12, wherein different first threshold values are designated with respect to each taught point.

14. The robot system according to claim 13, wherein a shape of a space within a robot coordinate system defined by the first threshold values is a shape according to a trajectory formed by connecting the taught points with lines in an order of the taught points.

* * * * *